United States Patent
Cann et al.

(10) Patent No.: US 8,835,582 B2
(45) Date of Patent: Sep. 16, 2014

(54) CATALYST SYSTEMS AND METHODS FOR USING SAME TO PRODUCE POLYOLEFIN PRODUCTS

(75) Inventors: Kevin J. Cann, Rocky Hill, NJ (US); C. Jeff Harlan, Houston, TX (US); Wesley R. Mariott, Pearland, TX (US); Lixin Sun, Sugar Land, TX (US); Daniel P. Zilker, Jr., Charleston, WV (US); F. David Hussein, Cross Lanes, WV (US); Phuong A. Cao, Old Bridge, NJ (US); John H. Moorhouse, Kendall Park, NJ (US); Mark G. Goode, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/576,908

(22) PCT Filed: Feb. 18, 2011

(86) PCT No.: PCT/US2011/025405
§ 371 (c)(1),
(2), (4) Date: Sep. 24, 2012

(87) PCT Pub. No.: WO2011/103402
PCT Pub. Date: Aug. 25, 2011

(65) Prior Publication Data
US 2013/0035463 A1 Feb. 7, 2013

Related U.S. Application Data

(60) Provisional application No. 61/306,749, filed on Feb. 22, 2010.

(51) Int. Cl.
*C08F 4/54* (2006.01)
*C08F 10/02* (2006.01)
*C08F 4/58* (2006.01)

(52) U.S. Cl.
USPC ............ 526/226; 502/152; 502/132; 502/117

(58) Field of Classification Search
USPC .......................... 526/226; 502/152, 132, 117
See application file for complete search history.

(56) References Cited

U.S. PATENT DOCUMENTS

2004/0014596 A1 * 1/2004 Saudemont et al. .......... 502/120
2005/0159300 A1   7/2005 Jenson et al.

FOREIGN PATENT DOCUMENTS

| EP | 0906920 A1 | 4/1999 | |
|---|---|---|---|
| WO | WO 2007/127417 A2 | 11/2007 | |
| WO | WO 2007/127417 A2 * | 11/2007 | ................ C08F 4/44 |

* cited by examiner

*Primary Examiner* — Robert D. Harlan
(74) *Attorney, Agent, or Firm* — Jennifer A. Schmidt; Kristina Leavitt

(57) ABSTRACT

Catalyst systems and methods for making and using the same. The catalyst system can include a single site catalyst compound, a support comprising fluorinated alumina, and an aluminoxane. The aluminoxane can be present in an amount of about 10 mmol or less per gram of the support.

30 Claims, No Drawings

CATALYST SYSTEMS AND METHODS FOR USING SAME TO PRODUCE POLYOLEFIN PRODUCTS

This application is a National Stage application under 35 U.S.C. §371 of International Application No. PCT/US2011/025405, filed Feb. 18, 2011, which claims the benefit of U.S. Provisional Patent Application Ser. No. 61/306,749, filed Feb. 22, 2010, the disclosures of which are incorporated by reference in their entirety.

BACKGROUND

A number of catalyst compositions containing single site catalysts have been used to prepare polyolefins, producing relatively homogeneous copolymers at good polymerization rates. In contrast to traditional Ziegler-Natta catalyst compositions, single site catalyst compositions, such as metallocene catalysts, are catalytic compounds in which each catalyst molecule contains one or only a few polymerization sites.

To achieve acceptable and economically viable polymerization activities with single site catalyst systems, a large amount of activator such as methylaluminoxane ("MAO") is often required. Such activators are often expensive and the large amount of activator required to produce an active single site catalyst for polymerization has been a substantial impediment to the commercialization of single site catalysts for polyolefin production. There is a need, therefore, for new single site catalyst compositions for olefin polymerization and methods for making and using the same.

SUMMARY

Catalyst systems and methods for making and using the same are provided. The catalyst system can include a single site catalyst compound, a support comprising fluorinated alumina, and an aluminoxane, preferably methylaluminoxane, modified methylaluminoxane, or a combination thereof. The aluminoxane can be present in an amount of about 10 mmol or less per gram of the support.

DETAILED DESCRIPTION

It has been surprisingly and unexpectedly discovered that when an alumina-containing support has been fluorinated, a high level of catalyst productivity is obtained by increasing a concentration of the transition metal component in the single site catalyst compound. The catalyst system can include an activator, e.g., one or more aluminoxanes, in an amount of about 10 mmol or less per gram of support. It has also been surprisingly and unexpectedly discovered that a high level of catalyst productivity is obtained using a small amount of activator, i.e., about 3 mmol or less per gram of support, when the support is an alumina-containing support that has been fluorinated.

The transition metal component of the single site catalyst compound can be present in an amount ranging from a low of about 0.2 wt %, about 0.5 wt %, or about 0.7 wt % to a high of about 1 wt %, about 2 wt %, about 2.5 wt %, about 3 wt %, about 3.5 wt %, or about 4 wt %, based on the total weight of the catalyst system. Depending, at least in part, on the particular transition metal component(s) the amount of the transition metal component of the single site catalyst can vary. For example, if the transition metal component is Hf, the transition metal component can be present in the single site catalyst compound in an amount of about 0.6 wt % or more, about 0.7 wt % or more, about 0.8 wt % or more, about 0.85 wt % or more, about 0.9 wt % or more, about 0.95 wt % or more, about 1 wt % or more, about 1.05 wt % or more, about 1.1 wt % or more, about 1.15 wt % or more, about 1.2 wt % or more, about 1.25 wt % or more, or about 1.3 wt % or more, based on the total weight of the catalyst system. In another example, the Hf concentration in a Hf containing single site catalyst compound can be present in an amount of at least 0.8 wt %, at least 0.85 wt %, at least 0.9 wt %, at least 0.95 wt %, at least 1 wt %, at least 1.05 wt %, at least 1.1 wt %, at least 1.15 wt %, at least 1.2 wt %, at least 1.25 wt %, or at least 1.3 wt %, based on the total weight of the catalyst system. In another example, if the transition metal component is Zr, the transition metal component can be present in the single site catalyst compound in an amount ranging from a low of about 0.2 wt %, about 0.25 wt %, about 0.3 wt %, or about 0.35 wt % to a high of about 0.4 wt %, about 0.8 wt %, about 1 wt %, about 1.2 wt %, or about 1.5 wt %, based on the total weight of the catalyst system. For the purposes of this disclosure, the term "catalyst system" collectively refers to the one or more single site catalyst compounds, activators, and supports.

Increasing the amount of the transition metal component of the single site catalyst compound, when the support is a fluorinated alumina-containing support, increases the catalyst productivity. As such, using a fluorinated alumina-containing support allows for increasing the catalyst productivity by increasing the concentration of the transition metal component of the single site catalyst compound. For example, when using a fluorinated support, the catalyst productivity of the catalyst system can be increased by about 50%, about 60%, about 70%, about 80%, about 90%, about 100%, about 110%, about 120%, about 130%, or more by increasing the amount of the transition metal component of the single site catalyst compound, as compared to the same catalyst system using a non-fluorinated alumina-containing support and a lower concentration of the transition metal component of the single site catalyst system. In other words, for two similar catalyst systems, e.g., substantially similar activator concentrations, both including the same fluorinated alumina-containing support, and the same single site catalyst compound, the catalyst productivity can be increased by increasing the amount of the transition metal component of the single site catalyst compound.

It has also been surprisingly and unexpectedly discovered that the catalyst system can be combined with ethylene and one or more organo-aluminum compounds within a polymerization reactor at conditions sufficient to produce polyethylene having improved properties. For example, the presence of at least one organo-aluminum compound can increase a melt flow ratio ("MFR") or ("$I_{21}/I_2$") of the polymer as compared to using the same catalyst system, but in the absence of the at least one organo-aluminum compound. For example, the melt flow ratio (MFR) of a polymer can be increased by about 1%, about 3%, about 5%, about 8%, about 10%, about 13%, about 15%, about 18%, about 20%, about 23%, about 25%, about 27%, or about 30% by adding one or more organo-aluminum compounds to the polymerization reactor as compared to when the one or more organo-aluminum compounds are absent from the reactor. In another example, the melt flow ratio (MFR) can be increased by about 10% to about 20%, or about 15% to about 25%, or about 15% to about 22%, or about 13% to about 25% by introducing at least one organo-aluminum compound to the polymerization reactor. As used herein, the terms "MFR" and "$I_{21}/I_2$," interchangeably refer to the ratio of the flow index ("FI" or "$I_{21}$") to the melt index ("MI" or "$I_2$"). The MI ($I_2$) can be measured in accordance with ASTM D1238 (at 190° C., 2.16 kg weight). The FI ($I_{21}$) can be measured in accordance with ASTM D1238 (at 190° C., 21.6 kg weight).

The amount of the one or more organo-aluminum compounds within the polymerization reactor can range from about 1 ppmw to about 100 ppmw. For example, the one or more organo-aluminum compounds can be present within the polymerization reactor in an amount of about 5 ppmw to about 15 ppmw, about 8 ppmw to about 14 ppmw, about 5 ppmw to about 60 ppmw, about 10 ppmw to about 40 ppmw, or about 5 ppmw to about 30 ppmw. In another example, the one or more organo-aluminum compounds can be present within the polymerization reactor in an amount ranging from a low of about 1 ppmw, about 3 ppmw, about 5 ppmw, about 7 ppmw, or about 10 ppmw to a high of about 15 ppmw, about 20 ppmw, about 25 ppmw, about 30 ppmw, about 40 ppmw, or about 50 ppmw. The one or more organo-aluminum compounds can be introduced separately or independently from the catalyst system to the polymerization reactor. The one or more organo-aluminum compounds can be combined with the catalyst system and introduced to the polymerization reactor as a mixture. For example, the catalyst system and organo-aluminum compound(s) can be combined with one another and introduced as a slurry to the polymerization reactor.

The single site catalyst compound, the activator, and the support can be combined together in any order or sequence to produce the catalyst system. The order or sequence of the catalyst system preparation has negligible or no effect on the catalyst productivity. For example, the one or more single site catalyst compounds and activators can be combined to produce a catalyst/activator mixture, and the support and the catalyst/activator mixture can then be added independently to a polymerization reactor. The support, single site catalyst compound, and activator can be combined and introduced as a single catalyst system to the polymerization reactor. Alternatively, the single site catalyst compound and activator can be combined first to produce a catalyst/activator mixture and then the support can be added to the catalyst/activator mixture to produce the catalyst system. Alternatively, the single site catalyst compound and activator can be combined to produce a catalyst/activator mixture and then the catalyst/activator mixture can be added to the support to produce the catalyst system. Alternatively, the support and activator can be combined first to produce an activator/support mixture and then the single site catalyst compound can be added to activator/support mixture to produce the catalyst system. The single site catalyst compound can be added to the activator/support mixture before introduction to the polymerization reactor or the single site catalyst compound and the activator/support mixture can be independently introduced to the polymerization reactor and combined therein.

One or more diluents or carriers can be used to facilitate the combination of any two or more components of the catalyst system. For example, the single site catalyst compound and the activator can be combined together in the presence of toluene or another non-reactive hydrocarbon or hydrocarbon mixture to provide the catalyst/activator mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst/activator mixture or the catalyst/activator mixture can be added to the support.

The activator is preferably an aluminoxane, more preferably methylaluminoxane ("MAO") or modified methylaluminoxane ("MMAO") or a combination thereof. The amount of aluminoxane can be determined based on the amount of aluminum (Al) contained in the aluminoxane. The aluminoxane can be present in the catalyst system in an amount ranging from a low of about 0.1 mmol to about 10 mmol. For example, the aluminoxane can be present in the catalyst system in an amount of about 9.5 mmol of less, about 9 mmol or less, about 8 mmol or less, about 7.5 mmol or less, about 7 mmol or less, about 6.5 mmol or less, about 6 mmol or less, about 5.5 mmol or less, about 5 mmol or less, about 4.5 mmol or less, about 4 mmol or less, about 3.5 mmol or less, about 3 mmol or less, about 2.5 mmol or less, or about 2 mmol or less per gram of the support. For example, the aluminoxane may be present in the catalyst system in an amount ranging from a low of about 0.1 mmol, about 0.5 mmol, about 1 mmol, or about 1.5 mmol to a high of about 3 mmol, about 5 mmol, about 6 mmol, about 6.3 mmol, about 6.5 mmol, about 6.7 mmol, about 7 mmol, or about 8 mmol per gram of the support, with suitable ranges comprising the combination of any lower amount and any upper amount. Preferably, the aluminoxane is present in the catalyst system in an amount of about 3 mmol or less, about 2.7 mmol or less, about 2.5 mmol or less, about 2.3 mmol or less, or about 2 mmol or less per gram of the support. The aluminoxane can be present in the catalyst system in an amount ranging from a low of about 0.1 mmol, about 0.5 mmol, about 1 mmol, or about 1.5 mmol to a high of about 2 mmol, about 2.5 mmol, about 2.6 mmol, about 2.7 mmol, about 2.8 mmol, about 2.9 mmol, or about 3 mmol per gram of the support, with suitable ranges comprising the combination of any lower amount and any upper amount. Preferably, the aluminoxane can be present in the catalyst system in an amount ranging from about 1 mmol to about 3.5 mmol per gram of support, about 1.5 mmol to about 3 mmol per gram of support, about 1.5 mmol to about 2.8 mmol per gram of support, about 2 mmol to about 2.9 mmol per gram of support, or about 1 mmol to about 2.8 mmol per gram of the support, with suitable ranges comprising the combination of any lower amount and any upper amount.

The catalyst system having one or more aluminoxanes present in an amount of about 10 mmol or less, about 9 mmol or less, about 8 mmol or less, or 7 mmol or less, or 6.5 mmol or less, per gram of the support can have a catalyst productivity of at least 7,000, at least 8,000, at least 9,000, at least 10,000, at least 11,000, at least 12,000, at least 13,000, at least 14,000, at least 15,000, at least 16,000, or at least 17,000 grams polymer per gram catalyst system. For example, the catalyst system having one or more aluminoxanes present in an amount of about 8 mmol or less per gram of support can have a catalyst productivity ranging from a low of about 7,000, about 8,000, or about 9,000 to a high of about 12,000, about 16,000, about 20,000, about 24,000, about 26,000, about 28,000, or about 30,000 grams polymer per gram catalyst system, with suitable ranges comprising the combination of any lower productivity and any upper productivity. In another example, the catalyst system having one or more aluminoxanes present in an amount of about 7 mmol or less, per gram of support can have a catalyst productivity ranging from a low of about 5,000, about 6,000, about 7,000 or about 8,000 to a high of about 12,000, about 16,000, about 20,000, about 24,000, about 26,000, about 28,000, or about 30,000 grams polymer per gram catalyst system, with suitable ranges comprising the combination of any lower productivity and any upper productivity.

The catalyst system having one or more aluminoxanes present in an amount of about 3 mmol or less, or 2.5 mmol or less, or 2 mmol or less, per gram of the support can have a catalyst activity productivity of at least 2,000, at least 2,500, at least 3,500, at least 4,000, at least 4,500, at least 5,000, at least 5,500, at least 6,000, at least 6,500, at least 7,000, at least 7,500, at least 8,000, at least 8,500, at least 9,000, at least 9,500, or at least 10,000 grams polymer per gram catalyst system. For example, the catalyst system having one or more aluminoxanes present in an amount of about 3 mmol or less per gram of support can have a catalyst productivity ranging from a low of about 3,000, about 6,000, or about 7,000 to a high of about 12,000, about 16,000, about 20,000, about 24,000, about 26,000, about 28,000, or about 30,000 grams polymer per gram catalyst system, with suitable ranges comprising the combination of any lower productivity and any upper productivity. Preferably, the catalyst system having one or more aluminoxanes present in an amount of about 2.5 mmol or less, or 2 mmol or less, per gram of support can have a catalyst productivity ranging from a low of about 2,000, about 3,000, or about 4,000 to a high of about 8,000, about 10,000, about 12,000, about 14,000, about 16,000, about 20,000, about 24,000, about 26,000, or about 30,000 grams polymer per gram catalyst system, with suitable ranges comprising the combination of any lower productivity and any upper productivity.

The catalyst system having MAO or MMAO or both present in an amount of about 1 mmol to about 10 mmol per gram of support and a metal concentration of the single site catalyst ranging from about 0.2 wt % to about 1.3 wt % based on a total weight of the catalyst system, when the support is an alumina-containing support that has been fluorinated, can have a catalyst productivity of at least 7,000, at least 8,000, at least 10,000, at least 11,000, at least 12,000, at least 13,000, at least 14,000, at least 15,000, at least 16,000, or at least 17,000 grams polymer per gram catalyst system. For example, the catalyst system having MAO or MMAO or both present in an amount of about 2 mmol to about 7 mmol per gram of support and a metal concentration of the single site catalyst, e.g., Hf, ranging from about 0.9 wt % to about 1.2 wt % based on the total weight of the catalyst system, when the support is an alumina-containing support that has been fluorinated, can have a catalyst productivity ranging from a low of about 7,000, about 8,000, about 9,000, or about 10,000 to a high of about 12,000, about 14,000, about 16,000, about 18,000, about 20,000, about 22,000, about 24,000, about 27,000, or about 30,000 grams polymer per gram catalyst system, with suitable ranges comprising the combination of any lower productivity and any upper productivity.

The catalyst system having MAO or MMAO or both present in an amount of about 3 mmol or less per gram of support can have a catalyst productivity of at least 2,000, at least 4,000, at least 6,000, at least 8,000, or at least 10,000 grams polymer per gram catalyst system per hour. The catalyst system having MAO or MMAO or both present in an amount of about 3 mmol or less per gram of support can have a catalyst productivity ranging from a low of about 2,000, about 3,000, about 4,000, about 5,000, about 7,000, or about 8,000 to a high of about 12,000, about 16,000, about 18,000, about 20,000, about 22,000, about 24,000, about 26,000, about 28,000, or about 30,000 grams polymer per gram catalyst system, with suitable ranges comprising the combination of any lower productivity and any upper productivity.

Support

As used herein, the terms "support" and "carrier" are used interchangeably and refer to any support material, including a porous support material, such as talc, inorganic oxides, and inorganic chlorides. Other supports can include resinous support materials such as polystyrene, functionalized or crosslinked organic supports, such as polystyrene divinyl benzene polyolefins or other polymeric compounds, or any other organic or inorganic support material and the like, or mixtures thereof.

The one or more single site catalyst compounds can be supported on the same or separate supports together with the activator, or the activator can be used in an unsupported form, or can be deposited on a support different from the single site catalyst compound(s), or any combination thereof. This may be accomplished by any technique commonly used in the art. There are various other methods in the art for supporting a single site catalyst compound. For example, the single site catalyst compound can contain a polymer bound ligand as described in, for example, U.S. Pat. Nos. 5,473,202 and 5,770,755. The single site catalyst compounds can be spray dried as described in, for example, U.S. Pat. No. 5,648,310. The support used with the single site catalyst compound can be functionalized, as described in EP 0 802 203, or at least one substituent or leaving group is selected as described in U.S. Pat. No. 5,688,880.

The support can be or comprise one or more inorganic oxides. The support can be an inorganic oxide that includes one or more metal oxides of Group 2, 3, 4, 5, 13, or 14 elements. For example, the inorganic oxide can include, but is not limited to, alumina, silica, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include alumina, silica, or a combination thereof.

Supports that include two or more inorganic oxides can have any ratio or amount of each oxide, relative to one another, can be used. For example, an alumina-silica catalyst support can include from about 1 wt % alumina to about 99 wt % alumina, based on the total amount of alumina and silica. In one or more embodiments, an alumina-silica catalyst support can have an alumina concentration ranging from a low of about 2 wt %, about 5 wt %, about 15 wt %, or about 25 wt % to a high of about 50 wt %, about 60 wt %, about 70 wt %, or about 90 wt %, based on the total amount of alumina and silica. For example, the alumina concentration of the alumina-silica catalyst support can be about 20 wt %, about 25 wt %, about 30 wt %, about 35 wt %, about 40 wt %, about 45 wt %, about 50 wt %, about 55 wt %, about 60 wt %, about 70 wt %, about 80 wt %, or about 90 wt %. In another example, the aluminum concentration of the support can range from a low of about 2 wt %, about 3 wt %, about 4 wt % or about 5 wt % to a high of about 10 wt %, about 20 wt %, about 30 wt %, about 40 wt %, or about 45 wt %, based on a weight of the support. In another example, the aluminum concentration of the support can range from about 2 wt % to about 12 wt %, about 3 wt % to about 10 wt %, about 4 wt % to about 8 wt % or about 3 wt % to about 7 wt %, based on the weight of the support. In another example, the aluminum concentration of the support can range from a low of about 20 wt %, about 23 wt %, or about 25 wt % to a high of about 35 wt %, about 40 wt %, or about 45 wt %, based on the weight of the support.

Suitable commercially available silica supports can include, but are not limited to, ES757, ES70, and ES70W available from PQ Corporation. Suitable commercially available silica-alumina supports can include, but are not limited to, SIRAL® 1, SIRAL® 5, SIRAL® 10, SIRAL® 20, SIRAL® 28M, SIRAL® 30, and SIRAL® 40, available from SASOL®.

A mixed inorganic oxide catalyst support can be prepared using any suitable method. For example, a silica catalyst support can be mixed, blended, contacted, or otherwise combined with one or more aluminum compounds to produce a silica support and aluminum compound(s) mixture. The silica catalyst support can be mixed with the one or more aluminum compounds in a water and/or alcohol solution and dried to produce the silica support and aluminum compound(s) mixture. Suitable alcohols can include, but are not limited to, alcohols having from 1 to 5 carbon atoms, and mixtures or combinations thereof. For example, the alcohol can be or include methanol, ethanol, propan-1-ol, propan-2-ol, and the like. Suitable aluminum compounds can include, but are not limited to, aluminum monoacetate $((HO)_2AlC_2H_3O_2)$, aluminum diacetate $(HOAl(C_2H_3O_2)_2)$, and aluminum triacetate $(Al(C_2H_3O_2)_3)$, aluminum hydroxide $(Al(OH)_3)$, aluminum diacetate hydroxide $(Al(OAc)_2OH)$, aluminum tri-acetylacetonate, aluminum fluoride $(AlF_3)$, sodium hexafluoroaluminate $(Na_3AlF_6)$, or any combination thereof.

The silica support and aluminum compound(s) mixture can be heated (calcined) in the presence of one or more inert gases, oxidants, reducing gases, or in any order/combination thereof to produce an alumina-silica catalyst support. As used herein, the term "oxidant" can include, but is not limited to, air, oxygen, ultra-zero air, oxygen/inert gas mixtures, or any combination thereof. Inert gases can include, but are not limited to, nitrogen, helium, argon, or combinations thereof. Reducing gases can include, but are not limited to, hydrogen, carbon monoxide, or combinations thereof.

The silica support and aluminum compound(s) mixture can be heated to a first temperature under nitrogen gas or other inert gas. After heating to the first temperature the nitrogen gas can be stopped, one or more oxidants can be introduced, and the temperature can be increased to a second temperature. For example, the silica support and aluminum compound(s) mixture can be heated under an inert atmosphere to a temperature of about 200° C., the oxidant can be introduced, and the mixture can then be heated to a temperature of from about 450° C. to about 1,500° C. to produce an alumina-silica catalyst support. The second temperature can range from a low of about 250° C., about 300° C., about 400° C., or about 500° C. to a high of about 600° C., about 650° C., about 700° C., about 800° C., or about 900° C. For example, the second temperature can range from about 400° C. to about 850° C., about 800° C. to about 900° C., about 600° C. to about 850° C., or about 810° C. to about 890° C. The silica support and aluminum compound(s) mixture can be heated and held at the second temperature for a period of time ranging from about 1 minute to about 100 hours. For example, the silica support and alumina compound(s) mixture can be heated and held at the second temperature for a time ranging from a low of about 30 minutes, about 1 hour, or about 3 hours to a high of about 10 hours, about 20 hours, or about 50 hours. In one or more embodiments, the silica support and alumina compound(s) mixture can be heated from ambient temperature to the second or upper temperature without heating to an intermediate or first temperature. The silica support and alumina compound(s) mixture can be heated under a nitrogen or other inert atmosphere initially, which can be modified to include the one or more oxidants or the atmosphere can be or include the one or more oxidants at the initial heating from ambient temperature.

The support can be mixed, blended, contacted, or otherwise combined with one or more sources of halide ions, sulfate ions, or a combination of anions to produce an inorganic oxide catalyst support and anion mixture, which can be heated or calcined to produce an activated support. For example, one or more halide ion sources, sulfate ion sources, metal ion sources, or any combination thereof, can be dry mixed, i.e., mixed without the presence of a liquid or intentionally added liquid, with the inorganic oxide support. In another example, the one or more halide ion sources, sulfate ion sources, metal ion sources, or any combination thereof, can be wet mixed, i.e., in the presence of a liquid, with the inorganic oxide catalyst support. Illustrative liquids can include, but are not limited to, alcohols, water, or a combination thereof. Suitable alcohols can include, but are not limited to, alcohols having from 1 to 5 carbon atoms, and mixtures or combinations thereof. The mixture, either dry mixed or wet mixed, can be calcined to produce an activated support.

The activated support can include, but is not limited to, brominated alumina, brominated alumina-silica, brominated silica, fluorinated alumina, fluorinated alumina-silica, fluorinated silica, fluorinated alumina-zirconia, fluorinated silica-zirconia, fluorinated-chlorinated alumina, fluorinated-chlorinated alumina-silica, chlorinated alumina, chlorinated alumina-silica, chlorinated silica, sulfated alumina, sulfated alumina-silica, sulfated silica, or any combination thereof. The support can be treated with one or more metal ions in addition to or in lieu of the one or more halide ion sources and/or sulfate ion sources. Illustrative metal ions can include, but are not limited to, copper, gallium, molybdenum, silver, tin, tungsten, vanadium, zinc, or any combination thereof.

Illustrative fluorinating or fluoriding agents can include, but are not limited to, ammonium hexafluorosilicate $((NH_4)_2SiF_6)$, fluorine $(F_2)$, hydrofluoric acid (HF), ammonium fluoride $(NH_4F)$, ammonium bifluoride $(NH_4HF_2)$, ammonium tetrafluoroborate $(NH_4BF_4)$, ammonium hexafluorophosphate $(NH_4PF_6)$, ammonium heptafluorotantalate(V) $(NH_4)_2TaF_7$, Ammonium hexafluorogermanate(IV) $(NH_4)_2GeF_6$, ammonium hexafluorotitanate(IV) $(NH_4)_2TiF_6$, ammonium hexafluorozirconate $(NH_4)_2ZrF_6$, aluminum fluoride $(AlF_3)$, sodium hexafluoroaluminate $(Na_3AlF_6)$, molybdenum(VI) fluoride $(MoF_6)$, bromine pentafluoride $(BF_5)$, nitrogen trifluoride $(NF_3)$, ammonium hydrogen difluoride $(NHF_2)$, perfluorohexane $C_6F_{14}$, hexafluorobenzene $(C_6F_6)$, fluoromethane $(CH_3F)$, trifluoroethanol $(C_2H_3F_3O)$, freons, derivatives thereof, or any combination thereof. Illustrative chlorinating or chloriding agents can include, but are not limited to, freons, perchlorobenzene, chloromethane, dichloromethane, chloroform, carbon tetrachloride, trichloroethanol, hydrogen chloride, chlorine, derivatives thereof, or any combination thereof. Illustrative sulfating agents can include, but are not limited to, sulfuric acid, sulfate salts such as ammonium sulfate, or any combination thereof.

Illustrative freons can include, but are not limited to, trichlorofluoromethane $(CCl_3F)$, trichlorodifluoromethane $(CCl_2F_2)$, chlorotrifluoromethane $(CClF_3)$, chlorodifluoromethane $(CHClF_2)$, dichlorofluoromethane $(CHCl_2F)$, chlorofluoromethane $(CH_2ClF)$, bromochlorodifluoromethane $(CBrClF_2)$, 1,1,2-trichloro-1,2,2-trifluoroethane $(Cl_2FC—CClF_2)$, 1,1,1-trichloro-2,2,2-trifluoroethane $(Cl_3C—CF_3)$, 1,2-dichloro-1,1,2,2-tetrafluoroethane $(ClF_2C—CClF_2)$, 1-chloro-1,1,2,2,2-pentafluoroethane $(ClF_2C—CF_3)$, 2-chloro-1,1,1,2-tetrafluoroethane $(CHFClCF_3)$, 1,1-dichloro-1-fluoroethane $(Cl_2FC—CH_3)$, 1-chloro-1,1-difluoroethane $(ClF_2C—CH_3)$, tetrachloro-1,2-difluoroethane $(CCl_2FCCl_2F)$, tetrachloro-1,1-difluoroethane $(CClF_2CCl_3)$, 1,1,2-trichlorotrifluoroethane $(CCl_2FCClF_2)$, 1-bromo-2-chloro-1,1,2-trifluoroethane $(CHClFCBrF_2)$, 2-bromo-2-chloro-1,1,1-trifluoroethane $(CF_3CHBrCl)$, 1,1-dichloro-2,2,3,3,3-pentafluoropropane $(CF_3CF_2CHCl_2)$, 1,3-dichloro-1,2,2,3,3-pentafluoropropane $(CClF_2CF_2CHClF)$.

The amount of the halide ion source(s), sulfate ion source(s), and/or metal ion source(s) mixed with the support can range from a low of about 0.01 wt %, about 0.1 wt %, or about 1 wt % to a high of about 10 wt %, about 20 wt %, about 30 wt %, about 40 wt %, or about 50 wt %, based on the total weight of the mixture, i.e., the support, halide ion source, sulfate ion source, and/or metal ion source. For example, a fluorinating agent in an amount of from about 0.01 g to about 0.5 g can be combined per gram of inorganic oxide catalyst support. In another example, the halide ion source can be a fluorinating agent, the support can be silica-alumina, and the amount of fluoride on the support can range from a low of about 2 wt %, about 3 wt %, about 3.5 wt %, about 4 wt %, about 4.5 wt %, or about 5 wt % to a high of about 8 wt %, about 9 wt %, about 10 wt %, about 11 wt %, or about 12 wt %, based on the weight of the support. In another example, the halide ion source can be a fluorinating agent, the support can be silica, calcined in the presence of an aluminum source, and the amount of fluoride on the support can range from a low of about 1.5 wt %, about 2 wt %, or about 2.5 wt % to a high of about 3.5 wt %, about 4 wt %, about 4.5 wt %, or about 5 wt %, based on the weight of the support.

The mixture of the support and the one or more sources of halide ions, sulfate ions, or a combination of anions can be heated (calcined) in the presence of one or more inert gases, oxidants, reducing gases, in any order, any combination thereof, or any order/combination thereof to produce an activated support. For example, a fluorinating agent/alumina-silica support mixture can be heated to a first temperature under a nitrogen gas purge or other inert gas or combination of inert gases. After heating to the first temperature the inert gas can be stopped, the one or more oxidants can be introduced, and the temperature can be increased to a second temperature. For example, the fluorinating agent/alumina-silica support mixture can be heated under an inert atmosphere to a temperature of about 200° C., the oxidant can be introduced, and the mixture can be heated to a temperature of about 600° C. or more to produce the activated support. The fluorinating agent/alumina-silica support mixture can be heated to a second temperature ranging from a low of about 250° C., about 300° C., or about 400° C. to a high of about 600° C., about 750° C., or about 900° C. The fluorinating agent/alumina-silica support mixture can be heated and held at the second temperature for a period of time ranging from about 1 minute to about 100 hours. For example, the fluorinating agent/alumina-silica support mixture can be heated and held at the second temperature for a time ranging from a low of about 30 minutes, about 1 hour, or about 3 hours to a high of about 10 hours, about 20 hours, or about 50 hours.

The one or more halide ion source(s), sulfate ion source(s), and/or metal ion source(s) can be introduced during heating or calcining, in lieu of, or in addition to combining the halide ion source(s), sulfate ion source(s), and/or metal ion source(s), and the support prior to heating.

The one or more halide ion source(s), sulfate ion source(s), and/or metal ion source(s) can be mixed, blended, contacted, or otherwise combined with the silica support and aluminum compound(s) mixture. The combined halide ion source(s), sulfate ion source(s), and/or metal ion source(s), silica support, and aluminum compound(s) mixture can then be heated together, rather than separately, to produce the activated support. For example, a fluoride source such as ammonium hexafluorosilicate ($(NH_4)_2SiF_6$) can be combined with the silica and aluminum compound(s) mixture, which can then be calcined to produce a fluorinated alumina-silica support.

The activated catalyst support can have a surface area ranging from a low of about 1 $m^2/g$, about 50 $m^2/g$, or about 100 $m^2/g$ to a high of about 400 $m^2/g$, about 500 $m^2/g$, or about 800 $m^2/g$. The activated catalyst support can have a pore volume ranging from a low of about 0.01 $cm^3/g$, about 0.1 $cm^3/g$, about 0.8 $cm^3/g$, or about 1 $cm^3/g$ to a high of about 2 $cm^3/g$, about 2.5 $cm^3/g$, about 3 $cm^3/g$, or about 4 $cm^3/g$. The activated catalyst support can have an average particle size ranging from a low of about 0.1 μm, about 0.3 μm, about 0.5 μm, about 1 μm, about 5 μm, about 10 μm, or about 20 μm to a high of about 50 μm, about 100 μm, about 200 μm, or about 500 μm. The average pore size of the activated catalyst support can range from about 10 Å to about 1,000 Å, preferably from about 50 Å to about 500 Å, and more preferably from about 75 Å to about 350 Å.

Suitable catalyst supports are discussed and described in Hlalky, Chem. Rev. (2000), 100, 1347 1376 and Fink et al., Chem. Rev. (2000), 100, 1377 1390, U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664, and WO 95/32995, WO 95/14044, WO 96/06187, and WO 97/02297.

Activator

As used herein, the terms "activator" and "cocatalyst" are used interchangeably and refer to any compound or combination of compounds, supported or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component.

For example, the activator can include a Lewis acid or a non-coordinating ionic activator or ionizing activator, or any other compound including Lewis bases, aluminum alkyls, and/or conventional-type cocatalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri(n-butyl)ammonium tetrakis(pentafluorophenyl)boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O-subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum such as triisobutylaluminum. MMAOs are generally more soluble in aliphatic solvents and more stable during storage. There are a variety of methods for preparing aluminoxane and modified aluminoxanes, non-limiting examples can be as discussed and described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0 561 476; EP 0 279 586; EP 0 594-218; and EP 0 586 665; and WO Publications WO 94/10180 and WO 99/15534.

In one or more embodiments, a visually clear MAO can be used. For example, a cloudy and/or gelled aluminoxane can be filtered to produce a clear aluminoxane or clear aluminoxane can be decanted from a cloudy aluminoxane solution. In another embodiment, a cloudy and/or gelled aluminoxane can be used. Another aluminoxane can include a modified methyl aluminoxane ("MMAO") type 3A (commercially available from Akzo Chemicals, Inc. under the trade name Modified Methylaluminoxane type 3A, discussed and described in U.S. Pat. No. 5,041,584). A suitable source of MAO can be a solution having from about 1 wt % to about a 50 wt % MAO, for example. Commercially available MAO solutions can include the 10 wt % and 30 wt % MAO solutions available from Albemarle Corporation, of Baton Rouge, La.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Preferably the alkyaluminum compound is a trialkylaluminum compound. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

In at least one specific embodiment, the catalyst system can be free or substantially free from any intentionally added organo-aluminum compounds. In other words, in at least one embodiment, the use of organo-aluminum compounds can be avoided or otherwise not intentionally added to the catalyst system.

In one or more embodiments, one or more ionizing or stoichiometric activators, neutral or ionic, can be used in combination with aluminoxane or modified aluminoxane. For example, tri(n-butyl) ammonium tetrakis(pentafluorophenyl) boron, a trisperfluorophenyl boron metalloid precursor or a trisperfluoronaphthyl boron metalloid precursor, polyhalogenated heteroborane anions (WO 98/43983), boric acid (U.S. Pat. No. 5,942,459), or combinations thereof can be used. Examples of neutral stoichiometric activators can include tri-substituted boron, tellurium, aluminum, gallium, indium, or any combination thereof. The three substituent groups can each be independently selected from alkyls, alkenyls, halogen, substituted alkyls, aryls, arylhalides, alkoxy and halides. Preferred neutral stoichiometric activators include trisperfluorophenyl boron or trisperfluoronaphthyl boron.

Catalyst Compound

The single site catalyst compound can be or include one or more metallocene catalysts and other single-site catalysts. Other catalyst compounds that may be used include chromium-based catalysts, Ziegler-Natta catalysts, transition metal catalyst, and bimetallic catalysts. For example, the catalyst compound may comprise $AlCl_3$, cobalt, iron, palladium, chromium/chromium oxide or "Phillips" catalysts. Any catalyst can be used alone or in combination with the others, i.e., a "mixed" catalyst.

Metallocene Catalyst Compounds

Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlalky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can include "half sandwich" and/or "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4 or +5; and in yet a more particular exemplary embodiment can be +2, +3 or +4. The groups bound to the metal atom "M" are such that the compounds described below in the formulas and structures are electrically neutral, unless otherwise indicated. The Cp ligand(s) forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the formula (I):

$$Cp^{A}Cp^{B}MX_{n} \qquad (I)$$

where M is as described above; each X is chemically bonded to M; each Cp group is chemically bonded to M; and n is 0 or an integer from 1 to 4, and either 1 or 2 in a particular exemplary embodiment.

The ligands represented by $Cp^{A}$ and $Cp^{B}$ in formula (I) can be the same or different cyclopentadienyl ligands or ligands isolobal to cyclopentadienyl, either or both of which can contain heteroatoms and either or both of which can be substituted by a group R. In at least one specific embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in structure (I) as well as ring substituents in structures Va-d, discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron and combinations thereof. Also, a substituent group R such as 1-butanyl can form a bonding association to the element M.

Each X in the formula (I) above and for the formula/structures (II) through (Va-d) below is independently selected from the group consisting of: any leaving group, in one exemplary embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls), in yet a more particular exemplary embodiment; and fluoride, in yet a more particular exemplary embodiment.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methoxy, ethyoxy, propoxy, phenoxy, bis(N-methylanilide), dimethylamide, dimethylphosphide radicals and the like. In one exemplary embodiment, two or more X's form a part of a fused ring or ring system. In at least one specific embodiment, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of formula (I) where $Cp^A$ and $Cp^B$ are bridged to each other by at least one bridging group, (A), such that the structure is represented by formula (II):

$$Cp^A(A)Cp^BMX_n \qquad (II)$$

These bridged compounds represented by formula (II) are known as "bridged metallocenes." The elements $Cp^A$, $Cp^B$, M, X and n in structure (II) are as defined above for formula (I); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In at least one specific embodiment, the bridging group (A) can also include substituent groups R as defined above (for formula (I)) including halogen radicals and iron. In at least one specific embodiment, the bridging group (A) can be represented by $C_1$ to $C_6$ alkylenes, substituted $C_1$ to $C_6$ alkylenes, oxygen, sulfur, $R'_2C=$, $R'_2Si=$, , $R'_2Ge=$, and $R'P=$, where "=" represents two chemical bonds, R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In at least one specific embodiment, the bridged metallocene catalyst compound of formula (II) includes two or more bridging groups (A). In one or more embodiments, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls comprise from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N and O, Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be either cis-, trans-, or a combination thereof.

The cyclic bridging groups (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular exemplary embodiment) such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms.

The ligands $Cp^A$ and $Cp^B$ of formula (I) and (II) can be different from each other. The ligands $Cp^A$ and $Cp^B$ of formula (I) and (II) can be the same.

The metallocene catalyst compound can include bridged mono-ligand metallocene compounds (e.g., mono cyclopentadienyl catalyst components). Exemplary metallocene catalyst compounds are further described in U.S. Pat. No. 6,943,134.

It is contemplated that the metallocene catalyst components discussed and described above include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso isomer does not, itself, constitute at least two different bridged, metallocene catalyst components.

As noted above, the amount of the transition metal component of the one or more metallocene catalyst compounds in the catalyst system can range from a low of about 0.2 wt %, about 3 wt %, about 0.5 wt %, or about 0.7 wt % to a high of about 1 wt %, about 2 wt %, about 2.5 wt %, about 3 wt %, about 3.5 wt %, or about 4 wt %, based on the total weight of the catalyst system.

The "metallocene catalyst compound" can include any combination of any "embodiment" discussed and described herein. For example, the metallocene catalyst compound can include, but is not limited to, bis(n-propylcyclopentadienyl) hafnium $(CH_3)_2$, bis(n-propylcyclopentadienyl) hafnium $F_2$, bis(n-propylcyclopentadienyl) hafnium $Cl_2$, bis(n-butyl, methyl cyclopentadienyl) zirconium $Cl_2$, [(2,3,4,5,6 $Me_5C_6N)CH_2CH_2]_2NHZrBz_2$, where Bz is a benzyl group, or any combination thereof.

In addition to the metallocene catalyst compounds discussed and described above, other suitable metallocene catalyst compounds can include, but are not limited to, metallocenes discussed and described in U.S. Pat. Nos. 7,741,417; 7,179,876; 7,169,864; 7,157,531; 7,129,302; 6,995,109; 6,958,306; 6,884,748; 6,689,847; and WO Publications WO 97/22635; WO 00/699/22; WO 01/30860; WO 01/30861; WO 02/46246; WO 02/50088; WO 04/026921; and WO 06/019494.

Other metallocene catalyst compounds that may be used are supported constrained geometry catalysts (sCGC) that comprise (a) an ionic complex, (b) a transition metal compound, (c) an organometal compound, and (d) a support material. Such sCGC catalysts are described in PCT Publication WO2011/017092. In some embodiments, the sCGC catalyst may comprise a borate ion. The borate anion is represented by the formula $[BQ_{4-z'}(G_q(T-H)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to M' and r groups (T-H); q is an integer, 0 or 1; the group (T-H) is a radical wherein T comprises O, S, NR, or PR, the O, S, N or P atom of which is bonded to hydrogen atom H, wherein R is a hydrocarbyl radical, a trihydrocarbylsilyl radical, a trihydrocarbyl germyl radical or hydrogen; r is an integer from 1 to 3; and d is 1. Alternatively the borate ion may be representative by the formula $[BQ_{4-z'}(G_q(T-M^oR^C_{x-1}X^a_y)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to B and r groups $(T-M^oR^C_{x-1}X^a_y)$; q is an integer, 0 or 1; the group $(T-M^oR^C_{x-1}X^a_y)$ is a radical wherein T comprises O, S, NR, or PR, the O, S, N or P atom of which is bonded to $M^o$, wherein R is a hydrocarbyl radical, a trihydrocarbylsilyl radical, a trihydrocarbyl germyl radical or hydrogen; $M^o$ is a metal or metalloid selected from Groups 1-14 of the Periodic Table of the Elements, $R^C$ independently each occurrence is hydrogen or a group having from 1 to 80 nonhydrogen atoms which is hydrocarbyl, hydrocarbylsilyl, or hydrocarbylsilylhydrocarbyl; $X^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide; x is a nonzero integer which may range from 1 to an integer equal to the valence of $M^o$; y is zero or a nonzero integer which may range from 1 to an integer equal to 1 less than the valence of $M^o$; and x+y equals the valence of $M^o$; r is an integer from 1 to 3; and d is 1. In some embodiments, the borate ion may be of the above described formulas where z' is 1 or 2, q is 1, and r is 1.

The catalyst system can include other single site catalysts such as Group 15-containing catalysts. The catalyst system can include one or more second catalysts in addition to the single site catalyst compound such as chromium-based catalysts, Ziegler-Natta catalysts, one or more additional single-site catalysts such as metallocenes or Group 15-containing catalysts, bimetallic catalysts, and mixed catalysts. The catalyst system can also include $AlCl_3$, cobalt, iron, palladium, or any combination thereof.

Group 15 Atom and Metal-Containing Catalyst Compounds

The catalyst system can include one or more Group 15 metal-containing catalyst compounds. The Group 15 metal-containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with formulas (VI) or (VII):

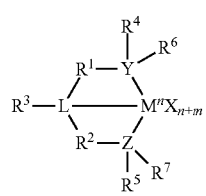

(VI)

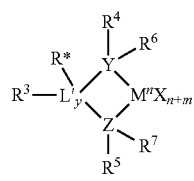

(VII)

where M is a Group 3 to 12 transition metal or a Group 13 or 14 main group metal, preferably a Group 4, 5, or 6 metal, and more preferably a Group 4 metal, and most preferably zirconium, titanium or hafnium; each X is independently a leaving group, preferably, an anionic leaving group, and more preferably hydrogen, a hydrocarbyl group, a heteroatom or a halogen, and most preferably an alkyl; y is 0 or 1 (when y is 0 group L' is absent); n is the oxidation state of M, preferably +3, +4, or +5, and more preferably +4; m is the formal charge of the YZL or YZL' ligand, preferably 0, −1, −2 or −3, and more preferably −2; L is a Group 15 or 16 element, preferably nitrogen; L' is a Group 15 or 16 element or Group 14 containing group, preferably carbon, silicon or germanium; Y is a Group 15 element, preferably nitrogen or phosphorus, and more preferably nitrogen; Z is a Group 15 element, preferably nitrogen or phosphorus, and more preferably nitrogen; $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ can also be interconnected to each other; $R^3$ is absent or a hydrocarbon group, hydrogen, a halogen, a heteroatom containing group; preferably a linear, cyclic or branched alkyl group having 1 to 20 carbon atoms, more preferably $R^3$ is absent, hydrogen or an alkyl group, and most preferably hydrogen; $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, and/or $R^4$ and $R^5$ may be interconnected to each other; $R^6$ and $R^7$ are independently absent, hydrogen, an alkyl group, halogen, heteroatom, or a hydrocarbyl group, preferably a linear, cyclic or branched alkyl group having 1 to 20 carbon atoms, and more preferably absent, and R* is absent, or is hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by the following formula (VII):

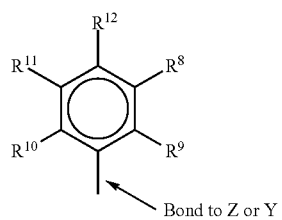

(VII)

where $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In one or more embodiments, $R^4$ and $R^5$ are both a group represented by the following formula (VIII):

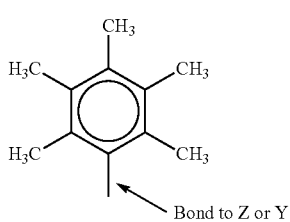

(VIII)

Bond to Z or Y where M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^2$ are absent.

The Group 15 metal-containing catalyst compound can be represented by the formula (IX):

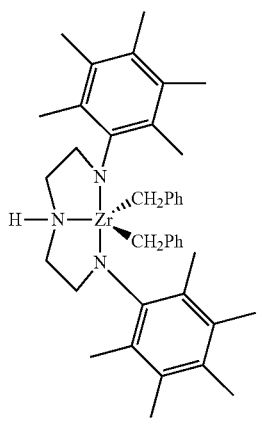

(IX)

where Ph equals phenyl. Representative Group 15-containing metal compounds and preparation thereof can be as discussed and described in U.S. Pat. Nos. 5,318,935; 5,889,128; 6,333,389; 6,271,325; and 6,689,847; WO Publications WO 99/01460; WO 98/46651; WO 2009/064404; WO 2009/064452; and WO 2009/064482; and EP 0 893 454; and EP 0 894 005.

Chromium Catalysts

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Ziegler-Natta Catalysts

Illustrative Ziegler-Natta catalyst compounds are disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Transition Metal Catalysts

Conventional-type transition metal catalysts are those traditional Ziegler-Natta catalysts that are well known in the art. These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3/AlCl_3$ and $Ti(OC_{12}H_{25})Cl_3$.

Catalysts derived from Mg/Ti/Cl/THF can be used. One example of the general method of preparation of such a catalyst includes the following: dissolve TiCl4 in THF, reduce the compound to $TiCl_3$ using Mg, add $MgCl_2$, and remove the solvent. Specific examples of other conventional-type transition metal catalysts are discussed in more detail in U.S. Pat. Nos. 4,115,639; 4,077,904; 4,482,687; 4,564,605; 4,721,763; 4,879,359; and 4,960,741. Conventional-type transition metal catalyst compounds based on magnesium/titanium electron-donor complexes are described in, for example, U.S. Pat. Nos. 4,302,565 and 4,302,566.

Mixed Catalyst System

The catalyst system can include a mixed catalyst, which can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred embodiment, the mixed catalyst includes at least one metallocene catalyst compound and at least one non-metallocene compound.

Continuity Additive/Static Control Agent

In processes disclosed herein, it may also be desired to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compound(s) being used. For example, the use of static control agents is disclosed in European Patent No. 0229368 and U.S. Pat. Nos. 4,803,251; 4,555,370; and 5,283,278, and references cited therein.

Control agents such as aluminum stearate may also be employed. The static control agent used may be selected for its ability to receive the static charge in the fluidized bed without adversely affecting productivity. Other suitable static control agents may also include aluminum distearate, ethoxylated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include, ethyleneimine additives useful in embodiments disclosed herein may include polyethyleneimines having the following general formula:

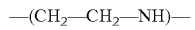

where n may be from about 10 to about 10,000. The polyethyleneimines may be linear, branched, or hyperbranched (i.e., forming dendritic or arborescent polymer structures). They can be a homopolymer or copolymer of ethyleneimine or mixtures thereof (referred to as polyethyleneimine(s) hereafter). Although linear polymers represented by the chemical formula —[$CH_2CH_2$ NH]— may be used as the polyethyleneimine, materials having primary, secondary, and tertiary branches can also be used. Commercial polyethyleneimine can be a compound having branches of the ethyleneimine polymer. Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF. Another useful continuity additive can include a mixture of aluminum distearate and an ethoxylated amine type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt % to about 50 wt % or about 10 wt % to about 40 wt %, or about 15 wt % to about 30 wt %. Other useful static control agents and additives are disclosed in U.S. Patent Application Publication No. 2008/0045663.

The continuity additive(s) or static control agent(s) may be added to the reactor in an amount ranging from 0.05 to 200 ppm, based on the weight of all feeds to the reactor, excluding recycle, more preferably in an amount ranging from 2 to 100 ppm; more preferably from 4 to 50 ppm in yet other embodiments.

Polymerization Process

The catalyst system can be used to polymerize one or more olefins to provide one or more polymer products therefrom. Any polymerization process including, but not limited to, high pressure, solution, slurry, and/or gas phase processes can be used. Preferably, a continuous gas phase process utilizing a fluidized bed reactor is used to polymerize ethylene and one or more optional comonomers to provide a polyethylene.

The term "polyethylene" refers to a polymer having at least 50 wt % ethylene-derived units, preferably at least 70 wt % ethylene-derived units, more preferably at least 80 wt % ethylene-derived units, or 90 wt % ethylene-derived units, or 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s). Suitable comonomers can contain 3 to 16 carbon atoms in one embodiment; from 3 to 12 carbon atoms in another embodiment; from 4 to 10 carbon atoms in another embodiment; and from 4 to 8 carbon atoms in yet another embodiment. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

A suitable fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases can be cooled and compressed to form liquids that increase the heat removal capacity of the circulating gas stream when readmitted to the reaction zone. A suitable rate of gas flow can be readily determined by simple experiment. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust can be removed in a cyclone and/or fines filter. The gas can be passed through a heat exchanger where at least a portion of the heat of polymerization can be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluid bed process can range from 30° C. or 40° C. or 50° C. to 90° C. or 100° C. or 110° C. or 120° C. or 150° C. In general, the reactor temperature can be operated at the highest feasible temperature taking into account the sintering temperature of the polymer product within the reactor. Regardless of the process used to make the polyolefins the polymerization temperature, or reaction temperature should be below the melting or "sintering" temperature of the polyolefins to be formed. Thus, the upper temperature limit in one embodiment is the melting temperature of the polyolefin produced in the reactor.

Hydrogen gas can be used in olefin polymerization to control the final properties of the polyolefin, such as described in "Polypropylene Handbook," at pages 76-78 (Hanser Publishers, 1996). Using certain catalyst systems, increasing concentrations (partial pressures) of hydrogen can increase the flow index (FI) of the polyolefin generated. The flow index can thus be influenced by the hydrogen concentration. The amount of hydrogen in the polymerization can be expressed as a mole ratio relative to the total polymerizable monomer, for example, ethylene, or a blend of ethylene and hexane or propylene. The amount of hydrogen used in the polymerization process can be an amount necessary to achieve the desired flow index of the final polyolefin resin. In one embodiment, the mole ratio of hydrogen to total monomer ($H_2$:monomer) can be in a range from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, where a desirable range can include any combination of any upper mole ratio limit with any lower mole ratio limit described herein. Expressed another way, the amount of hydrogen in the reactor at any time can range to up to 5,000 ppm, and up to 4,000 ppm in another embodiment, and up to 3,000 ppm in yet another embodiment, and between 50 ppm and 5,000 ppm in yet another embodiment, and between 50 ppm and 2,000 ppm in another embodiment. The amount of hydrogen in the reactor can range from a low of about 1 ppm, about 50 ppmw, or about 100 ppm to a high of about 400 ppm, about 800 ppm, about 1,000 ppm, about 1,500 ppm, or about 2,000 ppm. In yet another embodiment, the ratio of hydrogen to total monomer ($H_2$:monomer) can be about 0.00001:1 to about 2:1, about 0.005:1 to about 1.5:1, or about 0.0001:1 to about 1:1.

The one or more reactor pressures in a gas phase process (either single stage or two or more stages) can vary from 690 kPa (100 psig) to 3,448 kPa (500 psig), and in the range from 1,379 kPa (200 psig) to 2,759 kPa (400 psig) in another embodiment, and in the range from 1,724 kPa (250 psig) to 2,414 kPa (350 psig) in yet another embodiment.

The gas phase reactor can be capable of producing from about 10 kg of polymer per hour (25 lbs/hr) to 90,900 kg/hr (200,000 lbs/hr), and greater than 455 kg/hr (1,000 lbs/hr) in another embodiment, and greater than 4,540 kg/hr (10,000 lbs/hr) in yet another embodiment, and greater than 11,300 kg/hr (25,000 lbs/hr) in yet another embodiment, and greater than 15,900 kg/hr (35,000 lbs/hr) in yet another embodiment, and greater than 22,700 kg/hr (50,000 lbs/hr) in yet another embodiment, and from 29,000 kg/hr (65,000 lbs/hr) to 45,500 kg/hr (100,000 lbs/hr) in yet another embodiment.

A slurry polymerization process can also be used. A slurry polymerization process generally uses pressures in the range of from about 101 kPa (1 atmosphere) to about 5,070 kPa (50 atmospheres) and even greater and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene and comonomers and often hydrogen along with catalyst are added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed.

The polyethylene can have a melt index ratio ($I_{21}/I_2$) ranging from about 5 to about 300, more preferably from about 10 to less than about 250, and from about 15 to about 200. FI ($I_{21}$ can be measured in accordance with ASTM D1238 (190° C., 21.6 kg). The MI ($I_2$) can be measured in accordance with ASTM D1238 (at 190° C., 2.16 kg weight). FI ($I_5$) can be measured in accordance with ASTM D1238 (at 190° C., 5.0 kg weight).

Density can be determined in accordance with ASTM D-792. Density is expressed as grams per cubic centimeter ($g/cm^3$) unless otherwise noted. The polyethylene can have a density ranging from a low of about 0.89 $g/cm^3$, about 0.90 $g/cm^3$, or about 0.91 $g/cm^3$ to a high of about 0.95 $g/cm^3$, about 0.96 $g/cm^3$, or about 0.97 $g/cm^3$. The polyethylene can have a bulk density, measured in accordance with ASTM D1895 method B, of from about 0.25 $g/cm^3$ to about 0.5 $g/cm^3$. For example, the bulk density of the polyethylene can range from a low of about 0.30 $g/cm^3$, about 0.32 $g/cm^3$, or about 0.33 $g/cm^3$ to a high of about 0.40 $g/cm^3$, about 0.44 $g/cm^3$, or about 0.48 $g/cm^3$.

The polyethylene can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

EXAMPLES

To provide a better understanding of the foregoing discussion, the following non-limiting examples are provided. All parts, proportions and percentages are by weight unless otherwise indicated.

Preparation of Activated Supports

In Examples 1, 3, 8, 9, 26, and 27 and comparative example C10 a silica support impregnated with an aluminum compound, supplied by PQ Corporation, was combined with ammonium hexafluorosilicate to provide a support mixture. In Examples 2, 4-7, 11-19, 24, 28, and 29 and comparative example C8 a silica-alumina support was combined with ammonium hexafluorosilicate to provide a support mixture. In Examples 10, 20-23, and 25 and comparative examples $C_1$-$C_7$, C9, and C11 another silica support impregnated with an aluminum compound, supplied by PQ Corporation was combined with ammonium hexafluorosilicate to provide a support mixture. In all Examples, the resulting support mixtures were loaded into a single zone, vertical hinged, tube furnace and heated to convert the support mixture to a fluorinated or activated support.

To activate the support, a nitrogen gas flow at a velocity of between 0.10 ft/sec and 0.2 ft/sec was started. The furnace was heated from room temperature to 200° C. at 50° C. per hour and held at 200° C. for 2 hours. After 2 hours the nitrogen flow was stopped and air was introduced at about the same velocity, i.e., between 0.1 ft/sec and 0.2 ft/sec. The furnace was then heated to 600° C. at a rate of 50° C. per hour and held at 600° C. for 3 hours. After 3 hours the furnace was allowed to cool down to room temperature. At approximately 195° C. the flow of air was stopped and the nitrogen gas was started again. The furnace was purged with nitrogen gas for at least 30 minutes before removing the activated catalyst. The activated catalyst support was transferred into an oven-dried bottle.

Preparation of Catalyst Systems

Each catalyst system contained a metallocene catalyst compound, MAO, and one of the three fluorinated silica-alumina supports described above. For Examples 1-22 and 26-29 and comparative examples C1-C9 and C11, the metallocene catalyst compound was bis(n-propylcyclopentadienyl) hafnium $(CH_3)_2$. For Examples 23, 24, and C10, the catalyst was bis(n-butyl, methyl cyclopentadienyl) zirconium Cl$_2$. For Example 25, the catalyst was [(2,3,4,5,6 Me$_5$C$_6$N)CH$_2$CH$_2$]$_2$NHZrBz$_2$, where Bz is a benzyl group. One of two methods was used to prepare the catalyst systems.

Method 1: To prepare the supported catalyst systems, a 10 wt % to 30 wt % solution of MAO in toluene and additional toluene (dried and degassed) were introduced to a mixer at room temperature and slowly stirred. The metallocene catalyst compound was dissolved in 100 g of toluene and introduced to the mixer containing the MAO and toluene mixture. The stirring speed was increased to 130 rpm and continued for 1 hour at room temperature. The activated support (fluorinated alumina-silica) was then introduced to the mixer and stirred for 1 hour at room temperature. A vacuum was applied to remove the free liquid. Once the material was through the "mud stage," i.e., no free liquid was visible, a nitrogen gas purge was introduced to the mixer. During the mixing of the activated support, metallocene catalyst, and MAO, the temperature of the mixture was increased to a final temperature of about 78° C. to 80° C. and mixed for about 2 hours. The mixture was then cooled down to room temperature and stored in an oven-dried container under a nitrogen atmosphere.

Method 2: The metallocene catalyst was added to 10 wt % to 30 wt % MAO in toluene. This mixture was added to a mixer containing a slurry of the support and toluene. The mixture was dried with vacuum and heat.

The supports for Examples 1 and 3 were prepared at 600° C. employing 800 grams of PQ ES70W Silica treated with an aluminum compound and 44 grams ammonium hexafluorosilicate. The catalyst systems for Examples 1 and 3 were prepared by Method 1 above employing 14.22 g of the Hf compound, 361 g of the 30 wt % MAO, 1,812 g toluene, and 625 g of support. The support for Example 2 was prepared at 600° C. employing 1,000 grams of Sasol Siral 40 alumina/silica (a surface area of about 500 m$^2$/g, a pore volume of about 0.9 cm$^3$/g, and a particle size of about 38 μm) and 55 grams ammonium hexafluorosilicate. The catalyst system for Example 2 was prepared by Method 1 above employing 13.54 g of the Hf compound, 344 g of the 30% MAO, 1,725 g toluene and 595 g of support. The catalyst systems for comparative examples C1 and C2 were prepared by Method 1, except a higher amount of MAO was used and the support was PQ ES-757 silica (a surface area of about 300 m$^2$/g, a pore volume of about 1.5 cm$^3$/g, and a particle size of about 25 μm) dehydrated at 875° C.

Gas Phase Fluidized Bed Polymerization Process

Example Set I

A gas phase fluidized bed polymerization reactor of the UNIPOL™ process design having a nominal diameter of 14 inches was used for the continuous production of both linear low density polyethylene ("LLDPE") and high density polyethylene ("HDPE"). In these cases, the cycle gas blower was situated upstream of the cycle gas heat exchanger in the gas recirculation loop but the two could have been reversed to reduce the gas temperature where it entered the heat exchanger. The cycle pipe was about 2 inches in diameter and its flow rate was manipulated by a ball valve in the cycle line to control the superficial gas velocity in the fluid bed at the desired rate. Monomers and gaseous components were added upstream of the cooler before the blower, at the blower impeller or after the blower. The catalyst system was continuously added in discrete small aliquots via 0.125 inch tube directly to the fluidized bed at a height about 0.1 to 2 m above the distributor plate and most preferably at about the 0.2 to 1.2 m range using a nitrogen carrier gas flow at a location about 15% to about 50% of the reactor diameter. Continuity aid, an ethyleneimine copolymer, was also added (LUPASOL from BASF). Polymer product was withdrawn periodically from the reactor through a discharge isolation tank in aliquots of about 0.2 kg to 5 kg to maintain a desired approximate average fluidized bed level or weight.

In Examples 1 and 2 and C1 LLDPEs were produced. In Examples 3 and C2, HDPEs were produced. The catalyst systems for comparative examples C1 and C2 used a silica support. Table 1 summarizes the polymerization results below.

TABLE 1

| | Examples | | | | |
|---|---|---|---|---|---|
| | Ex. 1 | Ex. 2 | C1 | Ex. 3 | C2 |
| Polymer Type | LLDPE | LLDPE | LLDPE | HDPE | HDPE |
| mmol MAO/g support | 3 | 3 | 6.25 | 3 | 6.25 |
| Hf (wt %, based on the total weight of the catalyst system) | 0.813 | 0.907 | 0.785 | 0.813 | 0.785 |
| F (wt %, based on the weight of the support) | 3.19 | 3.54 | — | 3.19 | — |
| Al (wt %, based on the weight of the support) | 4.4 | 27.67 | — | 4.4 | — |
| Al (wt %, based on the total weight to the catalyst system) | 9.77 | 35.17 | — | 9.77 | — |
| Reaction Conditions | | | | | |
| Production Rate (lbs/hr) | 28.17 | 32.83 | 31.17 | 30 | 33 |
| Residence Time (hrs) | 3.1 | 2.8 | 3.03 | 3 | 2.86 |
| C2 Partial Pressure (psia) | 220.09 | 220.31 | 220.28 | 219.74 | 220.01 |
| H$_2$ (ppm) | 318 | 388 | 338 | 620 | 637 |
| C6/C2 Concentration Ratio (m/m) | 0.0145 | 0.0151 | 0.0161 | 0.002 | 0.0021 |
| Isopentane (mol %) | 8.27 | 8.05 | 8.09 | 8.2 | 8.89 |
| Pressure (psig) | 348.43 | 348.29 | 348.4 | 348.39 | 348.44 |
| Temperature (° C.) | 77 | 77 | 79 | 95 | 95 |
| Gas Velocity (ft/sec) | 2.09 | 2.1 | 2.03 | 2.07 | 2.09 |
| Fluid Bulk Density (lb/ft$^3$) | 16.71 | 11.36 | 18.81 | 15.86 | 15.09 |
| Continuity Additive Concentration (ppmw product) | 6 | 5.1 | 5.4 | 5.6 | 5.1 |

TABLE 1-continued

|  | Ex. 1 | Ex. 2 | C1 | Ex. 3 | C2 |
|---|---|---|---|---|---|
| Product Properties |  |  |  |  |  |
| Melt Index (dg/min) ($I_2$) | 0.856 | 0.896 | 0.9 | 45.415 | 42.317 |
| Flow Index ($I_5$) | 2.449 | 2.59 | 2.667 | 119.164 | 112.616 |
| Flow Index ($I_{21}$) | 24.11 | 26.246 | 27.543 | 871.004 | 828.425 |
| MFR ($I_{21}/I_2$) | 28.2 | 29.3 | 30.6 | 19.2 | 19.6 |
| MFR ($I_{21}/I_5$) | 9.8 | 10.1 | 10.3 | 7.3 | 7.4 |
| Density (g/cm$^3$) | 0.9155 | 0.9179 | 0.9176 | 0.9536 | 0.9546 |
| Bulk Density (g/cm$^3$) | 0.44 | 0.42 | 0.48 | 0.37 | 0.41 |
| Screen APS (in) | 0.0462 | 0.0319 | 0.0287 | 0.036 | 0.0261 |
| Screen Fines LT No 120 (wt %) | 0.15 | 1.08 | 0.15 | 0.11 | 0.19 |
| Catalyst Productivity |  |  |  |  |  |
| Catalyst Productivity (Hf ICPES) | 17,674 | 7,887 | 13,534 | 9,915 | 9,345 |

Examples 1 and 3 exhibited a greater catalyst productivity than the comparative examples C1 and C2, respectively, while using significantly less MAO. More particularly, the amount of MAO was reduced from the 6.25 mmol MAO/g support used in examples C1 and C2 to only 3.0 mmol MAO/g support for Examples 1-3, which is greater than 50% reduction. The catalyst productivity for Example 1 was 17,674 pounds polyethylene per pound catalyst system (lb PE/lb catalyst system) while the comparative example C1 only exhibited a catalyst productivity of 13,534 lb PE/lb catalyst system. As such, Example 1, which had only 3.0 mmol MAO/g support, showed an increase in catalyst productivity of about 30.6% over the comparative example C1 that used 6.25 mmol MAO/g support. The catalyst productivity for Example 3 was 9,915 lb PE/lb catalyst system while the comparative C1 only exhibited a catalyst productivity of 9,345 lb PE/lb catalyst system. As such, Example 3, which had only 3.0 mmol MAO/g support, showed an increase in catalyst productivity of about 6% over the comparative example C2 that used 6.25 mmol MAO/g support.

Gas Phase Fluidized Bed Polymerization Process

Example Set II

Another set of examples were prepared using the same gas phase fluidized bed polymerization reactor and conditions as in Example Set I, except that comparative example C3 and Example 4, the continuity additive was changed to a mixture of aluminum distearate and an ethoxylated amine type compound (IRGASTAT AS-990, available from Huntsman (formerly Ciba Specialty Chemicals)) that is slurried in mineral oil (Hydrobrite 380) to have total slurry concentration of approximately 20 wt %. The continuity additive for comparative example C4 and Example 5 was an ethyleneimine copolymer. The concentration of the continuity additive shown in Table 2 for each example is based on production rate of the polymer.

The catalyst systems for comparative examples C3 and C4 were prepared in the same manner as comparative examples C1 and C2, i.e., 6.25 mmol MAO and the support was of PQ ES-757 silica dehydrated at 875° C. The catalyst system used in Example 4 was prepared using Method 2 with less Hf and MAO. The support used for this example was Siral 40 activated at 600° C. with enough ammonium hexafluorosilicate to provide a final composition of about 26.59 wt % Al and about 5.68 wt % F, based on the weight of the support. The catalyst system used in Example 5 was prepared using Method 1. The support used for this example was Siral 40 activated at 600° C. with enough ammonium hexafluorosilicate to provide a final composition of about 23.27 wt % Al and about 4.96 wt % F, based on the weight of the support. Table 2 summarizes the polymerization results below.

TABLE 2

|  | C3 | Ex. 4 | C4 | Ex. 5 |
|---|---|---|---|---|
| Polymer Type | LLDPE | LLDPE | HDPE | HDPE |
| mmol MAO/g support | 6.25 | 2 | 6.25 | 2.5 |
| Hf (wt %, based on the total weight of the catalyst system) | 0.8 | 0.57 | 0.83 | 0.86 |
| Al (wt %, based on the total weight of the catalyst system) | 11.43 | 31.8 | 11.15 | 32.23 |
| Al (wt %, based on the weight of the support) | — | 26.59 | — | 23.27 |
| F (wt %, based on the weight of the support) | — | 5.68 | — | 4.96 |
| Reaction Conditions |  |  |  |  |
| Production Rate (lbs/hr) | 38.92 | 42 | 33.33 | 34.43 |
| STY (lb/hr/ft$^3$) | 6.5574 | 6.5864 | 4.3435 | 4.7965 |
| Residence Time (hrs) | 2.43 | 2.52 | 3.18 | 2.53 |
| C2 Partial Pressure (psia) | 220 | 220 | 220.16 | 220.32 |
| H$_2$ concentration (ppm) | 280 | 292 | 243 | 273 |
| C6/C2 Concentration Ratio (m/m) | 0.0167 | 0.0152 | 0.0155 | 0.0139 |
| Isopentane (mol %) | 7.15 | 7.13 | 7.78 | 7.56 |

TABLE 2-continued

|  | Examples | | | |
| --- | --- | --- | --- | --- |
|  | C3 | Ex. 4 | C4 | Ex. 5 |
| Pressure (psig) | 347.77 | 347.78 | 347.8 | 347.79 |
| Temperature (° C.) | 77.7 | 77.7 | 78.01 | 78 |
| Gas Velocity (ft/sec) | 2.04 | 1.86 | 2.09 | 2.18 |
| Bed Weight (lbs) | 95 | 106 | 106 | 87 |
| Fluid Bulk Density (lb/ft$^3$) | 16.04 | 16.69 | 13.92 | 12.3 |
| Continuity Additive Concentration (ppmw product) | 28.9 | 26.8 | 6.2 | 6 |
| Product Properties | | | | |
| Melt Index (dg/min) (I$_2$) | 0.922 | 0.819 | 0.613 | 0.554 |
| Flow Index (I$_5$) | 2.85 | 2.396 | 1.816 | 1.564 |
| Flow Index (I$_{21}$) | 30.61 | 24.232 | 20.05 | 14.588 |
| MFR (I$_{21}$/I$_2$) | 33.2 | 29.6 | 32.6 | 26.3 |
| MFR (I$_{21}$/I$_5$) | 10.7 | 10.1 | 11 | 9.3 |
| Density (g/cm$^3$) | 0.9191 | 0.9188 | 0.9178 | 0.9172 |
| Bulk Density (lb/ft$^3$) | 28.52 | 27.55 | 27.8 | 26.1 |
| Screen APS (in) | 0.0241 | 0.0322 | 0.0263 | 0.0391 |
| APS (micron) | 612 | 817 | 668 | 994 |
| Screen Fines LT No 120 (wt %) | 0.46 | 0.47 | 0.46 | 0.29 |
| Catalyst Productivity | | | | |
| Catalyst Productivity (Hf ICPES) | 7,207 | 8,507 | 8,947 | 15,636 |

Examples 4 and 5 exhibited greater catalyst productivity than the comparative examples C3 and C4, respectively, while using significantly less MAO. More particularly, the amount of MAO was reduced from the 6.25 mmol MAO/g support used in comparative examples C3 and C4 to only 2 mmol MAO/g support for Example 4 and 2.5 mmol MAO/g support for Example 5, which is a 68% and a 60% reduction in the amount of MAO, respectively. The catalyst productivity for Example 4 was 8,507 pounds polyethylene per pound catalyst system (lb PE/lb catalyst system) while the comparative example C3 only exhibited a catalyst productivity of 7,207 lb PE/lb catalyst system and required 68% more MAO. As such, Example 4, which had only 2 mmol MAO/g support, showed an increase in catalyst productivity of about 18% over the comparative example C1 that used 6.25 mmol MAO/g support or 68% more MAO. The catalyst productivity for Example 5 was 15,636 lb PE/lb catalyst system while the comparative C4 only exhibited a catalyst productivity of 8,947 lb PE/lb catalyst system. As such, Example 4, which had only 2.5 mmol MAO/g support, showed an increase in catalyst productivity of about 75% over the comparative example C4 that used 6.25 mmol MAO/g support or 60% more MAO.

Gas Phase Fluidized Bed Polymerization Process

Example Set III

Another set of examples were prepared using the same gas phase fluidized bed polymerization reactor and conditions as in Example Set I. The only difference in polymerization conditions was that the continuity additive was changed to a mixture of aluminum distearate and an ethoxylated amine type compound (IRGASTAT AS-990, available from Huntsman (formerly Ciba Specialty Chemicals)) that is slurried in mineral oil (Hydrobrite 380) to have total slurry concentration of approximately 20 wt %.

The catalyst system for Comparative Example C5 was prepared in the same manner as Comparative Examples C1 and C2, i.e., 6.25 mmol MAO and the support was of PQ ES-757 silica dehydrated at 875° C. The catalyst systems used in Examples 6 and 7 were prepared using Method 1 with higher MAO levels. The support used for this preparation was Siral 40 activated at 600° C. with enough ammonium hexafluorosilicate to provide a final composition of 25.32% Al and 4.88% F for Example 6 and 26.19% Al and 6.43% F for Example 7, based on the weight of the support.

The catalyst systems used in Examples 8 and 9 and comparative example C6 were prepared using Method 2. The support used for comparative example C6 was the same as comparative example C1 and C2. The support used for Examples 8 and 9 was PQ ES-70W with Al. Table 3 summarizes the polymerization results below.

TABLE 3

|  | Examples | | | | | |
| --- | --- | --- | --- | --- | --- | --- |
|  | C5 | Ex. 6 | Ex. 7 | C6 | Ex. 8 | Ex. 9 |
| Polymer Type | LLDPE | LLDPE | LLDPE | LLDPE | LLDPE | LLDPE |
| mmol MAO/g catalyst | 6.25 | 6.25 | 6.25 | 6.25 | 6.25 | 4.7 |
| Hf (wt %, based on the total weight of the catalyst system) | 0.785 | 1.043 | 1.05 | 0.74 | 1.08 | 1.05 |
| Al (wt %, based on the total weight of the catalyst system) | 11.7 | 32.7 | 33.1 | 11.6 | 13.53 | 12 |
| F (wt %, based on the weight of the support) | — | 4.88 | 6.43 | — | 2.96 | 3.23 |

TABLE 3-continued

| | Examples | | | | | |
|---|---|---|---|---|---|---|
| | C5 | Ex. 6 | Ex. 7 | C6 | Ex. 8 | Ex. 9 |
| Reaction Conditions | | | | | | |
| Production Rate (lbs/hr) | 42.4 | 39.6 | 43.44 | 38.22 | 41.00 | 41.00 |
| STY (lb/hr/ft$^3$) | 7.2303 | 6.6626 | 6.916 | | | |
| Residence Time (hrs) | 2.38 | 2.54 | 2.44 | 2.54 | 2.38 | 2.51 |
| C2 Partial Pressure (psia) | 220.07 | 219.81 | 220.08 | 220.07 | 219.98 | 219.58 |
| H$_2$ concentration (ppm) | 320 | 267 | 276 | 326 | 303 | 292 |
| C6/C2 Concentration Ratio (m/m) | 0.0157 | 0.0145 | 0.014 | 0.0154 | 0.0130 | 0.0130 |
| Isopentane (mol %) | 7.69 | 7.64 | 7.14 | 8.19 | 8.22 | 8.55 |
| Pressure (psig) | 347.85 | 347.95 | 347.82 | 348.59 | 348.55 | 348.18 |
| Temperature (° C.) | 79.25 | 77.72 | 77.70 | 78.00 | 78.00 | 78.00 |
| Gas Velocity (ft/sec) | 2.02 | 2.04 | 1.96 | 2.42 | 2.40 | 2.42 |
| Bed Weight (lbs) | 101 | 100 | 106 | 97 | 97 | 103 |
| Fluid Bulk Density (lb/ft$^3$) | 17.3 | 17 | 17.01 | 18.25 | 19.39 | 20.03 |
| Continuity Additive Concentration (ppmw product) | 26.5 | 28.4 | 25.9 | 29.4 | 27.4 | 29.3 |
| Product Properties | | | | | | |
| Melt Index (dg/min) (I$_2$) | 1.033 | 1.022 | 1.071 | 0.888 | 0.959 | 1.028 |
| Flow Index (I$_5$) | 2.979 | 2.93 | 3.032 | 2.584 | 2.613 | 2.838 |
| Flow Index (I$_{21}$) | 29.713 | 27.442 | 27.263 | 25.89 | 21.63 | 24.059 |
| MFR (I$_{21}$/I$_2$) | 28.8 | 26.9 | 25.5 | 29.2 | 22.6 | 23.4 |
| MFR (I$_{21}$/I$_5$) | 10 | 9.4 | 9 | 10 | 8.3 | 8.5 |
| Density (g/cm$^3$) | 0.9169 | 0.9185 | 0.9187 | 0.9183 | 0.9168 | 0.9181 |
| Bulk Density (lb/ft$^3$) | 29.46 | 26.48 | 26.57 | 29.57 | 26.5 | 26.37 |
| Screen APS (in) | 0.0243 | 0.0481 | 0.0526 | 0.0235 | 0.0477 | 0.0441 |
| APS (micron) | 616 | 1221 | 1335 | | | |
| Screen Fines LT No 120 (wt %) | 0.12 | 0.13 | 0.07 | 0.74 | 0.18 | 0.31 |
| Catalyst Productivity | | | | | | |
| Catalyst Productivity (Hf ICPES) | 7,336 | 14,486 | 15,672 | 10,423 | 19,265 | 13,150 |

Examples 6 and 7 exhibited a greater catalyst productivity than the comparative examples C5 by using the same amount of MAO, i.e., about 6.25 mmol/g support, but increasing the amount of the transition metal component (Hf) present in the catalyst from about 0.785 wt % to about 1.043 wt % and about 1.05 wt %, respectively. The catalyst productivity for Example 6 was about 14,486 pounds polyethylene per pound catalyst system (lb PE/lb catalyst system) while the comparative example C5 only exhibited a catalyst productivity of about 7,336 lb PE/lb catalyst system. As such, Example 6, which contained about 32.9% more Hf than CE 5, showed an increase in catalyst productivity of about 97.5% over the comparative example C5. The catalyst productivity for Example 7 was about 15,672 lb PE/lb catalyst system while the comparative example C5 only exhibited a catalyst productivity of about 7,336 lb PE/lb catalyst system. As such, Example 7, which contained about 33.7% more Hf than comparative example C5, showed an increase in catalyst productivity of about 114% over the comparative example C5.

Examples 8 and 9 also showed a surprising and unexpected increase in catalyst productivity. Example 9 used the same amount of MAO, i.e., about 6.25 mmol/g support, but increased the amount of Hf in the catalyst system from about 0.8 wt % to about 1.08 wt %, and yielded an increase in catalyst productivity of about 114%. Example 9 used about 24.8% less MAO (about 4.7 mmol/g support versus about 6.25 mmol/g support) than the comparative example C6, but increased the amount of Hf in the catalyst from about 0.8 wt % to about 1.05 wt %, and yielded an increase in catalyst productivity of about 66.4%.

Gas Phase Fluidized Bed Polymerization Process

Example Set IV

In comparative example C7 and Example 10 shown in Table 4 the catalyst was bis(n-propylcyclopentadienyl) hafnium (CH$_3$)$_2$ and a silica support (PQ ES-757 silica having a surface area of about 300 m$^2$/g, a pore volume of about 1.5 cm$^3$/g, and a particle size of about 25 μm) was mixed with an aluminum compound and ammonium hexafluorosilicate (18 ratio) and then calcined. The supports for comparative example C7 and Example 10 had an aluminum content of about 8.5 wt %, a silicon content of about 30 wt %, and a fluoride content of about 4 wt %. The catalysts were prepared by Method 2. In comparative example C8 and Example 11 the catalyst systems were prepared the same as in Example 4 above.

TABLE 4

| | Examples | | | |
|---|---|---|---|---|
| | C7 | Ex. 10 | C8 | Ex. 11 |
| Polymer Type | LLDPE | LLDPE | LLDPE | LLDPE |
| mmol MAO/g catalyst | 1.55 | 1.55 | 1.8 | 1.8 |
| Hf (wt %, based on the total weight of the catalyst system) | 0.887 | 0.887 | 0.89 | 0.89 |
| Al (wt %, based on the total weight of the catalyst system) | 8.457 | 8.457 | 30.57 | 30.57 |
| Al (wt %, based on the weight of the support) | 4.43 | 4.43 | 27.98 | 27.98 |
| F (wt %, based on the weight of the support) | 3.26 | 3.26 | 5.48 | 5.48 |
| Triethylaluminum (ppmw) | — | 11.34 | — | 11.59 |
| Reaction Conditions | | | | |
| Production Rate (lbs/hr) | 31.22 | 36.17 | 35.17 | 35.33 |
| STY (lb/hr/ft$^3$) | 4.8902 | 5.574 | 5.2236 | 5.6215 |
| Residence Time (hrs) | 3.33 | 2.91 | 3 | 3.05 |
| C2 Partial Pressure (psia) | 220.45 | 220.25 | 220.78 | 220.13 |
| C6/C2 Concentration Ratio (m/m) | 0.0137 | 0.0155 | 0.0142 | 0.0157 |
| H$_2$ concentration, ppm | 262 | 253 | 306 | 280 |
| Pressure (psig) | 347.8 | 347.8 | 347.64 | 347.8 |
| Temperature (° C.) | 77.99 | 77.98 | 76.98 | 77 |
| Gas Velocity (ft/sec) | 2.17 | 2.16 | 2.12 | 2.1 |
| Bed Weight (lbs) | 104 | 105 | 106 | 108 |
| Fluid Bulk Density (lb/ft$^3$) | 16.41 | 16.33 | 15.79 | 17.3 |
| Continuity Additive | Lupasol | Lupasol | Lupasol | Lupasol |
| Continuity Additive Concentration (ppmw product) | 6.6 | 5.7 | 5.9 | 5.8 |
| Product Properties | | | | |
| Melt Index (dg/min) (I$_2$) | 0.613 | 0.531 | 0.723 | 0.848 |
| Flow Index (I$_5$) | 1.755 | 1.572 | 2.077 | 2.548 |
| Flow Index (I$_{21}$) | 17.172 | 17.823 | 20.15 | 27.87 |
| MFR (I$_{21}$/I$_2$) | 28 | 33.6 | 27.9 | 32.9 |
| MFR (I$_{21}$/I$_5$) | 9.8 | 11.3 | 9.7 | 10.9 |
| Density (g/cm$^3$) | 0.9182 | 0.9181 | 0.9169 | 0.9186 |
| Bulk Density (lb/ft$^3$) | 28.5 | 28.45 | 26.4 | 27.37 |
| Screen APS (in) | 0.0299 | 0.0271 | 0.0409 | 0.045 |
| APS (micron) | 759 | 687 | 1039 | 1142 |
| Screen Fines LT No 120 (wt %) | 0.7 | 0.61 | 0.58 | 0.33 |
| Catalyst Productivity | | | | |
| Catalyst Productivity (Hf ICPES) | 9,966 | 13,239 | 11,978 | 18,804 |

The polymers produced in Examples 10 and 11 which included the addition of triethylaluminum to the polymerization reactor had an increased MFR as compared to the comparative examples C7 and C8, respectively. With regard to Example 10, triethylaluminum in an amount of about 11.34 ppmw was introduced to the polymerization reactor and the MFR of the polymer increased from about 28.0 (C7) to about 33.6, which was about a 20% increase in the MFR. Additionally, the hydrogen to ethylene (H$_2$/C$_2$) ratio and the hexene to ethylene ratio were adjusted in order to maintain similar density and melt index (I$_2$). With regard to Example 11, triethylaluminum in an amount of about 11.59 ppmw was introduced to the polymerization reactor and the MFR of the polymer increased from about 27.9 (C8) to about 32.9, which was about an 18% increase in the MFR. Similar to Example 10, the amounts of hydrogen and hexene were adjusted in order to maintain similar density and melt index (I$_2$). Additionally, the catalyst productivity for Examples 10 and 11 increased about 40% and about 56%, respectively with the addition of triethylaluminum.

Examples 10 and 11 show that additional control over the MFR of the polymer can be achieved using the catalyst systems discussed and described herein in conjunction with one or more organo-aluminum compounds, e.g., triethylaluminum. Increasing the MFR can provide a polymer product that can be more easily processed into products.

Slurry Polymerization Process

Example Set V

Examples 12-19 and comparative example C9 were prepared in a laboratory slurry process. Either triisobutylaluminum (TiBAl) or triethylaluminum (TEAL) was added to the reaction mixture. For examples having TiBAl, a ratio of the TiBAl to the total molar amount of catalyst metal was about 150:1. For examples having TEAL, a ratio of TEAL to the total molar amount of catalyst metal was about 30:1. The TiBAl or TEAL was added to scavenge impurities contained in the reactor or within the catalyst system that can render the catalyst ineffective.

For all Examples 12-19 and C9, the metallocene catalyst was bis(n-propylcyclopentadienyl)hafnium Me$_2$. The catalyst systems for Examples 12-19 included an alumina-silica support (Siral 40) that was mixed with ammonium hexafluorosilicate and calcined. The ammonium hexafluorosilicate/support ratio was about 18 for Examples 14, 15, and 18. The ammonium hexafluorosilicate/support ratio was about 12 for Examples 12, 13, 16, 17, and 19. The supports for examples 12-19 had an aluminum content of about 27 wt %, a silicon content of about 18 wt %, and a fluorine content of about 3.7-5.0 wt %. The catalysts were prepared according to Method 2. The catalyst systems in Examples 12-19 had a Hf loading of about 0.8 wt %.

The catalyst system in comparative example C9 is the same catalyst system employed in C1 and C2. Catalyst activity was measured in grams of polyethylene ("PE") per gram of catalyst system in one hour (gPE/g catalyst system·hr). Catalyst activity was also measured in grams of polyethylene per gram of catalyst (the metallocene catalyst) in one hour (gPE/gCat·hr).

A 1.5 liter autoclave reactor under a nitrogen purge was charged with catalyst, then 10 mL hexene and 400 cm$^3$ isobutane diluent. The reactor was heated to 90° C. and from about 40 mg to about 60 mg, depending on the particular example of each catalyst system was then each introduced to the reactor. For each example, ethylene (200 psig) was introduced to the reactor to provide a total reactor pressure of 434 psig. The reactor temperature was maintained at 90° C. and the polymerization was allowed to proceed for 21 to 70 minutes, depending on the particular example, and the reactor was then cooled. Ethylene was vented off and the polymer was dried and weighed to obtain the polymer yield. The polymerization results are summarized below in Table 5.

Examples 12-19 exhibited greater catalyst activity than the comparative examples C9, based on the amount of MAO present in the catalyst system. For example, comparative example C9, used about 6.25 mmol MAO per gram support and a catalyst activity of about 3,967 grams polymer per gram catalyst system per hour was observed. Example 19, used less than half the MAO as C8, i.e., about 3 mmol per gram of support versus 6.25 mmol per gram of support, and a catalyst activity of about 10,066 grams polymer per gram catalyst system was observed. Accordingly, in Example 19 the amount of MAO was reduced by over 50% while increasing the catalyst activity by over 153%.

Examples 20-22 shown in Table 6 were prepared similar to Examples 12-19. In Examples 20-22, the catalyst was bis(n-propylcyclopentadienyl) hafnium (CH$_3$)$_2$, and instead of fluorinating an alumina-silica support, a silica support (PQ ES-757 silica having a surface area of about 300 m$^2$/g, a pore volume of about 1.5 cm$^3$/g, and a particle size of about 25 μm) was mixed with an aluminum compound and ammonium hexafluorosilicate (18 ratio) and then calcined. The supports

TABLE 5

| | Examples | | | | | | | | |
|---|---|---|---|---|---|---|---|---|---|
| | Ex. 12 | Ex. 13 | Ex. 14 | Ex. 15 | Ex. 16 | Ex. 17 | Ex. 18 | Ex. 19 | C9 |
| Addition Cocatalyst/Scavenger | TiBAl | TEAL | TiBAl | TiBAl | TiBAl | TEAL | TiBAl | TiBAl | TiBAl |
| Weight of Catalyst System (g) | 0.04 | 0.04 | 0.05 | 0.05 | 0.05 | 0.05 | 0.05 | 0.05 | 0.056 |
| mmol MAO/g support | 1 | 1 | 1.5 | 2 | 2 | 2 | 3 | 3 | 6.25 |
| Al (wt %, based on the total weight of the catalyst system) | 29.9 | 29.9 | 29.9 | 29.9 | 29.3 | 29.3 | 28 | 29.1 | 11.1 |
| Hf (wt %, based on the total weight of the catalyst system) | 0.8 | 0.8 | 0.8 | 0.81 | 0.85 | 0.85 | 0.78 | 0.81 | 0.83 |
| Al (wt %, based on the weight of the support) | 26.14 | 26.14 | 30.39 | 27.67 | 26.14 | 26.14 | 24.9 | 26.14 | — |
| F (wt %, based on the weight of the support) | 5.12 | 5.12 | 3.08 | 3.54 | 5.12 | 5.12 | 3.54 | 5.12 | — |
| Weight of Catalyst (mg) | 0.89 | 0.88 | 1.01 | 1 | 1.07 | 1.09 | 1.04 | 1.08 | 1.1 |
| Polymer Yield (g) | 265 | 268 | 230 | 215 | 279 | 289 | 254 | 280 | 221 |
| Catalyst Activity (gPE/g catalyst system · hr) | 5,932 | 6,086 | 4,551 | 4,265 | 8,934 | 11,784 | 4,885 | 10,066 | 3,967 |
| Bulk Density (g/cm$^3$) | 0.37 | 0.37 | 0 | 0.34 | 0.39 | 0.4 | 0.36 | 0.36 | 0.33 |
| Catalyst Activity (gPE/gCat · hr) | 297,258 | 304,977 | 228,020 | 215,330 | 447,541 | 589,195 | 244,231 | 502,348 | 201,255 | for Examples 20-22 had an aluminum content of about 5 wt %, a silicon content of about 30 wt %, and a fluoride content of about 4 wt %. The catalyst systems were prepared employing Method 2.

was Siral 40 activated at 600° C. with ammonium hexafluorosilicate and was prepared by Method 1. The support for comparative example C10 was PQ ES70 Silica (a surface area of about 300 $m^2$/g, a pore volume of about 1.5 $cm^3$/gm, and a

TABLE 6

|  | Example | | | |
| --- | --- | --- | --- | --- |
|  | Ex. 20 | Ex. 21 | Ex. 22 | C9 |
| Addition Cocatalyst/Scavenger | TiBAl | TiBAl | TiBAl | TiBAl |
| Weight of Catalyst System (g) | 0.054 | 0.057 | 0.049 | 0.056 |
| mmol MAO/g support | 2.9 | 1.75 | 1 | 6.25 |
| Al (wt %, based on the total weight of the catalyst system) | 10.7 | 8.47 | 6.8 | 11.1 |
| Hf (wt %, based on the total weight of the catalyst system) | 0.85 | 0.89 | 0.84 | 0.83 |
| Al (wt %, based on the weight of the support) | 3.71 | 4.41 | 3.71 | — |
| F (wt %, based on the weight of the support) | 3.17 | 3.15 | 3.17 | — |
| Weight of Catalyst (mg) | 1.08 | 1.14 | 0.98 | 1.1 |
| Polymer Yield (g) | 282 | 281 | 181 | 221 |
| Catalyst Activity (gPE/g catalyst system · hr) | 6,227 | 5,668 | 3,662 | 3,967 |
| Bulk Density (g/$cm^3$) | 0.4 | 0.41 | 0.4 | 0.33 |
| Catalyst Activity (gPE/gCat · hr) | 313,633 | 284,413 | 184,224 | 201,255 |

The catalyst systems having fluorinated alumina-silica supports exhibited greater catalyst activity as compared to the catalyst system not having a fluorinated alumina-silica support. Example 20, having only about 2.9 mmol of MAO per gram support exhibited a catalyst activity of about 6,227 gPE/g catalyst system·hr. The comparative example C9, having more than twice the amount of MAO at about 6.25 mmol per gram of support exhibited a catalyst activity of only about 3,967 gPE/g catalyst system per·hr, which is about 36% less.

In Examples 23, 24 and C10, the catalyst was bis(n-butyl, methyl cyclopentadienyl) zirconium $Cl_2$. In Example 25, the catalyst was [(2,3,4,5,6 $Me_5C_6N)CH_2CH_2]_2NHZrBz_2$, where Bz is a benzyl group. The supports for Examples 23 and 25 were the same as those used in Examples 20-22 and were also prepared by Method 2. The support for Example 24 particle size of about 48 μm) dehydrated at 600° C. and was prepared by Method 2. The polymerization results are summarized below in Table 7 below.

TABLE 7

|  | Example | | | |
| --- | --- | --- | --- | --- |
|  | Ex. 23 | Ex. 24 | Ex. 25 | C10 |
| Addition Cocatalyst/Scavenger | TiBAl | TiBAl | TiBAl | TiBAl |
| Weight of Catalyst System (g) | 0.08 | 0.07 | 0.04 | 0.11 |
| mmol MAO/g support | 2.9 | 2.9 | 2.9 | 6.25 |
| Al (wt %, based on the total weight of the catalyst system) | 9.5 | 30.2 | 9.4 | — |
| Zr (wt %, based on the total weight of the catalyst system) | 0.35 | 0.35 | 0.37 | 0.35 (target) |
| Al (wt %, based on the weight of the support) | — | 26.8 | — | — |
| F (wt %, based on the weight of the support) | 2.91 | 4.09 | — | — |
| Weight of Catalyst (mg) | 1.1 | 1.02 | 1 | 2 |
| Polymer Yield (g) | 280 | 179 | 204 | 173 |
| Catalyst Activity (gPE/g catalyst system · hr) | 4,190 | 2,410 | 4,909 | 1,524 |
| Bulk Density (g/$cm^3$) |  | 0.41 | 0.3 | 0.45 |
| Catalyst Activity (gPE/gCat · hr) | 305,455 | 175,108 | 204,220 | 86,590 |

The catalyst activity for all three Examples 23-25 surprisingly and unexpectedly exhibited a greater catalyst activity while using less MAO, as compared to comparative example C10. For example, in Example 25, using the catalyst [(2,3,4, 5,6 $Me_5C_6N)CH_2CH_2]_2NHZrBz_2$, where Bz is a benzyl group, only used about 2.90 mmol MAO per gram of support and had a catalyst activity of about 4,190 gPE/g catalyst system·hr. Comparative example C10, having more than twice the amount of MAO at about 6.25 mmol per gram of support only had a catalyst activity of about 1,524 gPE/g catalyst system·per hr. Example 25 also exhibited a catalyst activity comparable to Examples 14, 15, and 18.

The catalyst activity for Examples 23-24 exhibited a greater catalyst activity while using less MAO, as compared to comparative example C10. Examples 23 and 24 had a catalyst activity of 4,190 gPE/g catalyst system·per hr and 2,410 gPE/g catalyst system·per hr, respectively, while the comparative example C10 (having more than twice the amount of MAO at about 6.25 mmol per gram of support) only had a catalyst activity of about 1,524 gPE/g catalyst system·per hr. Example 25, which used the [(2,3,4,5,6-Me$_5$C$_6$N)CH$_2$CH$_2$]$_2$NHZrBz$_2$, where Bz is a benzyl group catalyst, only about 2.90 mmol MAO per gram of support was used and exhibited a catalyst activity of about 4,190 gPE/g catalyst system·hr. The catalyst activity exhibited in Example 25 was comparable to Examples 14, 15, and 18.

Lab Gas Phase Polymerization Process

Example Set VI

Additional examples using catalysts employing higher MAO levels were conducted in a 1.5 liter stirred gas phase reactor with a 400 g salt bed (NaCl). The reactor was operated with about 220 psi ethylene, about 400-450 ppm hydrogen, and a hexane/ethylene charge ratio of about 0.026 at about 85° C. for one hour. The catalyst was charged under reactor pressure and about 5 grams of a mixture of MAO on silica (about 6.5 mmol MAO per gram silica) was pre-charged as a scavenger.

The catalyst systems used in Examples 26 and 27 and comparative example C11 were prepared by Method 2 with higher MAO levels. The supports used for Examples 26 and 27 were the same as that used in Example 1 (PQ ES-70W with Al) with enough ammonium hexafluorosilicate added to provide a final composition of about 3.23 wt % F for Example 26 and about 4.24 wt % Al and 2.96 wt % F for Example 27, based on the weight of the support. The support used for comparative example C11 was PQ ES-757 silica (a surface area of about 300 m$^2$/g, a pore volume of about 1.5 cm$^3$/g, and a particle size of about 25 nm) dehydrated at 875° C.

The catalyst systems used in Examples 28 and 29 were prepared using Method 2 with higher MAO levels, i.e., about 6.25 mmol MAO/g support. Example 29, as compared to Example 28, had a higher concentration of the transition metal component of the catalyst, i.e., about 1.02 wt % versus about 0.83 wt % based on the total weight of the catalyst system. The supports used for Examples 28 and 29 were Siral 40 activated at 600° C. with enough ammonium hexafluorosilicate to provide a final composition of 26.03 wt % Al and 5.24 wt % F, based on the weight of the support. For Examples 25-29 and C11, the metallocene catalyst compound was bis (n-propylcyclopentadienyl) hafnium (CH$_3$)$_2$. The polymerization results are summarized below in Table 8.

C11, but increased the amount of Hf in the catalyst from about 0.8 wt % to about 1.03 wt %, and yielded an increase in catalyst productivity of about 106%. Example 27 used the same amount of MAO, i.e., about 6.25 mmol/g support, but increased the amount of Hf in the catalyst system from about 0.8 wt % to about 1.08 wt %, and yielded an increase in catalyst productivity of about 113%.

Example 29, as compared to Example 28, also shows a surprising and unexpected increase in catalyst activity when only the amount of the transition metal component, i.e., Hf, was increased with the composition of the substrate and the amount of MAO remaining the same. More particularly, the concentration of MAO and the particular support for both examples were the same, i.e., about 6.25 mmol MAO and fluorinated Siral 40. Example 28 had a Hf concentration of about 0.83 wt % based on the total weight of the catalyst system and exhibited a catalyst activity of about 10,733 gPE/g catalyst system per hour. Example 29, however, having an increased Hf concentration, i.e., about 1.02 wt %, as compared to Example 26 that only contained about 0.83 wt %, exhibited a catalyst activity of about 14,762 gPE/g catalyst system per hour, which is about a 37% increase in catalyst activity.

All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A catalyst system, comprising:
   a single site catalyst compound;
   a support comprising fluorinated alumina; and

TABLE 8

| | Example | | | | |
|---|---|---|---|---|---|
| | C11 | Ex. 26 | Ex. 27 | Ex. 28 | Ex. 29 |
| mmol MAO/g support | 6.25 | 4.7 | 6.25 | 6.25 | 6.25 |
| Hf (wt %, based on the total weight of the catalyst system) | 0.8 | 1.03 | 1.08 | 0.83 | 1.02 |
| Al (wt %, based on the total weight of the catalyst system) | 12 | 11.4 | 11.55 | 34.5 | 34.1 |
| Al (wt %, based on the weight of the support) | — | 4.24 | | 26.03 | 26.03 |
| F (wt %, based on the weight of the support) | 0 | 3.23 | 2.96 | 5.24 | 5.24 |
| Weight of Catalyst System (g) | 0.0062 | 0.0061 | 0.0061 | 0.0109 | 0.0084 |
| Polymer Yield (g) | 43 | 87 | 90 | 117 | 124 |
| Catalyst Activity (gPE/g catalyst system · hr) | 6,935 | 14,262 | 14,754 | 10,733 | 14,762 |

Increasing the Hf loading when using a fluorinated support, greatly increases the catalyst productivity. Example 26 used about 24.8% less MAO (about 4.7 mmol/g support versus about 6.25 mmol/g support) than the comparative example an aluminoxane, wherein the aluminoxane is present in an amount of 7 mmol or less per gram of the support.

2. The catalyst system of claim 1, wherein the support has a fluoride concentration ranging from about 1 wt % to about 10 wt %, based on a weight of the support and an aluminum concentration ranging from about 3 wt % to about 40 wt %, based on the weight of the support.

3. The catalyst system of claim 1, wherein the single site catalyst compound has a metal concentration ranging from about 0.2 wt % to about 1.3 wt %, based on a total weight of the catalyst system.

4. The catalyst system of claim 1, wherein the aluminoxane is present in an amount of about 3 mmol or less per gram of the support.

5. The catalyst system of claim 1, wherein the support further comprises silica.

6. The catalyst system of claim 1, wherein the single site catalyst compound comprises a metallocene catalyst.

7. The catalyst system of claim 6, wherein the metallocene catalyst has the formula:

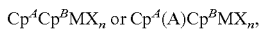

$Cp^A Cp^B MX_n$ or $Cp^A(A)Cp^B MX_n$, wherein M is a Group 4, 5 or 6 atom; $Cp^A$ and $Cp^B$ are each bound to M and are independently selected from the group consisting of cyclopentadienyl ligands, substituted cyclopentadienyl ligands, ligands isolobal to cyclopentadienyl and substituted ligands isolobal to cyclopentadienyl; (A) is a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, wherein the heteroatom containing hydrocarbonyls comprise from one to three heteroatoms; X is a leaving group selected from the group consisting of chloride ions, bromide ions, $C_1$ to $C_{10}$ alkyls, and $C_2$ to $C_{12}$ alkenyls, carboxylates, acetylacetonates, and alkoxides; and n is an integer from 1 to 3.

8. The catalyst system of claim 1, wherein the single site catalyst compound comprises a compound having the formula:

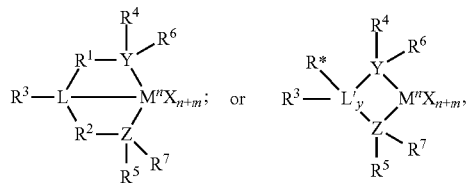

wherein M is a Group 3 to 12 transition metal or a Group 13 or 14 main group metal; each X is independently an anionic leaving group; y is 0 or 1; n is the oxidation state of M; m is the formal charge of the ligand represented by YZL or YZL'; L is a Group 15 or 16 element; L' is a group 15 or 16 element or Group 14 containing group; Y is a Group 15 element; Z is a Group 15 element; $R^1$ and $R^2$ are independently a $C_1$ to $C_{20}$ hydrocarbon group, a heteroatom containing group having up to twenty carbon atoms, silicon, germanium, tin, lead, or phosphorus; $R^1$ and $R^2$ may be interconnected to each other; $R^3$ is absent, a hydrocarbon group, hydrogen, a halogen, or a heteroatom containing group; $R^4$ and $R^5$ are independently an alky group, an aryl group, a substituted aryl group, a cyclic alkyl group, a substituted cyclic alkyl group, a cyclic aralkyl group, a substituted cyclic aralky group, or a multiple ring system; $R^4$ and $R^5$ may be interconnected to each other; $R^6$ and $R^7$ are independently absent, hydrogen, an alkyl group, a halogen, a heteroatom, or a hydrocarbyl group; and R* is absent, hydrogen, a Group 14 atom containing group, a halogen, or a heteroatom containing group.

9. The catalyst system of claim 1, wherein the catalyst system further comprises one or more second catalysts selected from a metallocene, a Ziegler-Natta catalyst, chromium catalyst, transition metal catalyst, Group 15-containing catalyst, or any combination thereof.

10. The catalyst system of claim 1, further comprising one or more organo-aluminum compounds.

11. A method for making the catalyst system of claim 1, comprising:
combining the single site catalyst compound, the support comprising fluorinated alumina, and the aluminoxane, wherein the aluminoxane is present in an amount of 7 mmol or less per gram of the support.

12. The method of claim 11, further comprising combining one or more organo-aluminum compounds with the single site catalyst compound and the support.

13. The method of claim 11, wherein the fluorinated alumina is prepared by calcining a silica-alumina support at a temperature of from about 200° C. to about 1,000° C. in the presence of a fluorine source.

14. The method of claim 11, wherein the fluorinated alumina is prepared by calcining a silica support at a temperature of from about 200° C. to about 1,000° C. in the presence of an aluminum source and a fluorine source.

15. The method of claim 11, wherein the fluorine source comprises ammonium hexafluorosilicate, ammonium bifluoride, ammonium tetrafluoroborate, or any combination thereof.

16. The method of claim 11, wherein the single site catalyst compound and the aluminoxane are combined to produce a first mixture.

17. The method of claim 11, wherein the single site catalyst compound and the aluminoxane are combined in a diluent.

18. The method of claim 16, wherein the support is combined with the first mixture.

19. The method of claim 16, wherein the first mixture and the support are independently added to the polymerization reactor.

20. The method of claim 11, wherein the support and the aluminoxane are combined to produce a first mixture.

21. The method of claim 20, wherein the first mixture is combined with the single site catalyst compound outside a polymerization reactor.

22. The method of claim 20, wherein the first mixture is combined with the single site catalyst compound within a polymerization reactor.

23. A method for olefin polymerization, comprising:
contacting ethylene and at least one comonomer comprising one or more $C_4$ to $C_8$ alpha olefins with the catalyst system of claim 1 in a polymerization reactor at conditions sufficient to produce a polyethylene.

24. The method of claim 23, further comprising adjusting the concentration of the one or more $C_4$ to $C_8$ alpha olefins within the polymerization reactor to control at least one of the density and the melt index ($I_2$) of the polyethylene.

25. The method of claim 23, further comprising introducing one or more organo-aluminum compounds to the polymerization reactor.

26. The method of claim 25, wherein the organo-aluminum compound is added to the reactor in an amount sufficient to increase the melt flow ratio (MFR) of the polyethylene.

27. The method of claim 23, further comprising adjusting a concentration of hydrogen within the reactor to control at least one of the density and the melt index ($I_2$) of the polyethylene.

28. The method of claim 23, wherein the ethylene is contacted with the catalyst system under gas phase conditions.

29. The method of claim 23, wherein the catalyst system has a productivity of at least 2,000 grams of polyethylene per gram of the catalyst system.

30. The method of claim 23, wherein the catalyst system has a productivity of at least 8,000 grams of polyethylene per gram of the catalyst system.

* * * * *